US008753022B2

(12) United States Patent  
Schroeder et al.

(10) Patent No.: US 8,753,022 B2
(45) Date of Patent: Jun. 17, 2014

(54) LC CONNECTOR AND METHOD OF ASSEMBLY

(75) Inventors: Michael D. Schroeder, Webster, MN (US); Ponharith Nhep, Savage, MN (US); Steven C. Zimmel, Minneapolis, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 55 days.

(21) Appl. No.: 13/308,209

(22) Filed: Nov. 30, 2011

(65) Prior Publication Data

US 2012/0170896 A1 Jul. 5, 2012

Related U.S. Application Data

(60) Provisional application No. 61/418,252, filed on Nov. 30, 2010.

(51) Int. Cl.
*G02B 6/36* (2006.01)
*G02B 6/38* (2006.01)

(52) U.S. Cl.
CPC .............. *G02B 6/3893* (2013.01); *G02B 6/387* (2013.01); *G02B 6/3887* (2013.01); *G02B 6/389* (2013.01)
USPC .................... 385/81; 385/76; 385/77; 385/78; 385/84; 385/86

(58) Field of Classification Search
CPC ...... G02B 6/387; G02B 6/3887; G02B 6/389; G02B 6/3893
USPC ......................................................... 385/81
See application file for complete search history.

(56) References Cited

U.S. PATENT DOCUMENTS

| 4,611,875 A | 9/1986 | Clarke et al. |
| 4,953,929 A | 9/1990 | Basista et al. |

(Continued)

FOREIGN PATENT DOCUMENTS

| AU | 696950 B2 | 8/1996 |
| CA | 2149681 A1 | 12/1995 |

(Continued)

OTHER PUBLICATIONS

International Search Report and Written Opinion mailed Jun. 12, 2012.

(Continued)

*Primary Examiner* — Ryan Lepisto
(74) *Attorney, Agent, or Firm* — Merchant & Gould P.C.

(57) ABSTRACT

A fiber optic connector includes a front housing having sidewalls each defining a slot and a rear insert with a pair of locking flanges extending radially away, the locking flanges configured to snap-fit into the slots, each locking flange defining a front face and a rear face, the radially outermost portion of the rear face defining an edge, the edge being the rearmost extending portion of the locking flange. Another fiber optic connector includes a front housing defining a front opening at a front end, a circular rear opening at a rear end, and an internal cavity extending therebetween. A rear insert including a generally cylindrical front portion is inserted into the front housing through the circular rear opening, the front portion defining at least one longitudinal flat configured to reduce the overall diameter of the generally cylindrical front portion configured to be inserted into the front housing.

9 Claims, 28 Drawing Sheets

(56) References Cited

U.S. PATENT DOCUMENTS

| | | |
|---|---|---|
| 5,076,656 A | 12/1991 | Briggs et al. |
| 5,212,752 A | 5/1993 | Stephenson et al. |
| 5,224,186 A | 6/1993 | Kishimoto et al. |
| 5,461,690 A | 10/1995 | Lampert |
| 5,481,634 A | 1/1996 | Anderson et al. |
| 5,579,425 A * | 11/1996 | Lampert et al. .......... 385/59 |
| 5,638,474 A | 6/1997 | Lampert et al. |
| 5,647,043 A | 7/1997 | Anderson et al. |
| 5,675,682 A | 10/1997 | De Marchi |
| 5,719,977 A | 2/1998 | Lampert et al. |
| 5,883,995 A | 3/1999 | Lu |
| 5,923,805 A | 7/1999 | Anderson et al. |
| 5,984,531 A | 11/1999 | Lu |
| 6,017,153 A | 1/2000 | Carlisle et al. |
| 6,017,154 A | 1/2000 | Carlisle et al. |
| 6,024,498 A | 2/2000 | Carlisle et al. |
| 6,076,973 A | 6/2000 | Lu |
| 6,076,974 A | 6/2000 | Carlisle et al. |
| 6,102,581 A | 8/2000 | Deveau et al. |
| 6,142,676 A | 11/2000 | Lu |
| 6,155,146 A | 12/2000 | Andrews et al. |
| 6,196,731 B1 | 3/2001 | Carlisle et al. |
| 6,196,733 B1 | 3/2001 | Wild |
| 6,206,581 B1 | 3/2001 | Driscoll et al. |
| 6,217,230 B1 | 4/2001 | Matsushita |
| 6,234,683 B1 | 5/2001 | Waldron et al. |
| 6,234,685 B1 | 5/2001 | Carlisle et al. |
| 6,250,817 B1 | 6/2001 | Lampert et al. |
| 6,259,856 B1 | 7/2001 | Shahid |
| 6,287,018 B1 | 9/2001 | Andrews et al. |
| 6,293,710 B1 | 9/2001 | Lampert et al. |
| 6,296,398 B1 | 10/2001 | Lu |
| 6,318,903 B1 | 11/2001 | Andrews et al. |
| 6,325,547 B1 | 12/2001 | Cammons et al. |
| 6,325,549 B1 | 12/2001 | Shevchuk |
| 6,357,934 B1 | 3/2002 | Driscoll et al. |
| 6,364,685 B1 | 4/2002 | Manning |
| 6,367,984 B1 | 4/2002 | Stephenson et al. |
| 6,409,392 B1 | 6/2002 | Lampert et al. |
| 6,419,402 B1 | 7/2002 | Zimmel |
| 6,443,627 B1 | 9/2002 | Anderson et al. |
| 6,464,402 B1 | 10/2002 | Andrews et al. |
| 6,471,416 B2 | 10/2002 | Lu |
| 6,511,230 B1 | 1/2003 | Connelly et al. |
| 6,550,979 B1 | 4/2003 | Fleenor et al. |
| 6,565,262 B2 | 5/2003 | Childers et al. |
| 6,588,938 B1 | 7/2003 | Lampert et al. |
| 6,619,856 B1 | 9/2003 | Lampert et al. |
| 6,629,782 B2 | 10/2003 | McPhee et al. |
| 6,652,155 B2 | 11/2003 | Lampert |
| 6,663,292 B1 | 12/2003 | Shirakawa |
| 6,663,293 B2 | 12/2003 | Lampert et al. |
| 6,672,774 B2 | 1/2004 | Theuerkorn et al. |
| 6,672,898 B2 | 1/2004 | Kahle et al. |
| 6,705,765 B2 | 3/2004 | Lampert et al. |
| 6,705,768 B2 | 3/2004 | Serizawa |
| 6,722,790 B2 * | 4/2004 | Caveney ................ 385/81 |
| 6,789,954 B2 | 9/2004 | Lampert et al. |
| 6,799,898 B2 | 10/2004 | Cheng et al. |
| 6,817,780 B2 | 11/2004 | Ngo |
| 6,848,836 B2 | 2/2005 | Ueda et al. |
| 6,910,807 B2 | 6/2005 | Lu |
| 6,913,396 B2 | 7/2005 | Nelson |
| 6,916,120 B2 | 7/2005 | Zimmel et al. |
| 6,918,704 B2 * | 7/2005 | Marrs et al. ............. 385/78 |
| 6,984,074 B2 | 1/2006 | Makhlin et al. |
| 7,018,108 B2 | 3/2006 | Makhlin et al. |
| 7,104,702 B2 | 9/2006 | Barnes et al. |
| 7,118,288 B2 | 10/2006 | Lu |
| 7,201,518 B2 | 4/2007 | Holmquist |
| 7,204,644 B2 | 4/2007 | Barnes et al. |
| 7,234,877 B2 | 6/2007 | Sedor |
| 7,246,950 B2 | 7/2007 | Lu |
| 7,258,493 B2 | 8/2007 | Milette |
| 7,281,859 B2 | 10/2007 | Mudd et al. |
| 7,283,718 B2 | 10/2007 | Zaina et al. |
| 7,384,201 B2 | 6/2008 | Lu |
| 7,387,447 B2 | 6/2008 | Mudd et al. |
| 7,390,203 B2 | 6/2008 | Murano et al. |
| 7,473,037 B2 | 1/2009 | Robertson et al. |
| 7,503,702 B2 | 3/2009 | Lu |
| 7,534,115 B2 | 5/2009 | Murano et al. |
| 7,641,398 B2 | 1/2010 | O'Riorden et al. |
| 7,654,749 B2 | 2/2010 | Lu |
| 7,658,551 B1 | 2/2010 | Wu et al. |
| 7,674,046 B2 | 3/2010 | Milette |
| 7,690,848 B2 | 4/2010 | Faika et al. |
| 7,712,970 B1 | 5/2010 | Lee |
| 7,874,738 B2 | 1/2011 | Lu |
| 8,186,890 B2 | 5/2012 | Lu |
| 2002/0131722 A1 | 9/2002 | Lampert et al. |
| 2002/0197018 A1 | 12/2002 | Lampert |
| 2003/0161586 A1 * | 8/2003 | Hirabayashi .............. 385/78 |
| 2003/0231836 A1 | 12/2003 | Robertson et al. |
| 2004/0052474 A1 | 3/2004 | Lampert et al. |
| 2004/0151437 A1 | 8/2004 | Marrs et al. |
| 2004/0247252 A1 | 12/2004 | Ehrenreich et al. |
| 2004/0264875 A1 | 12/2004 | Makhlin et al. |
| 2004/0264877 A1 | 12/2004 | Makhlin et al. |
| 2005/0018973 A1 | 1/2005 | Loder et al. |
| 2005/0036744 A1 | 2/2005 | Caveney et al. |
| 2005/0117850 A1 | 6/2005 | Milette |
| 2005/0135753 A1 | 6/2005 | Eigenmann et al. |
| 2005/0147358 A1 | 7/2005 | Zaina et al. |
| 2005/0213890 A1 | 9/2005 | Barnes et al. |
| 2005/0213892 A1 | 9/2005 | Barnes et al. |
| 2006/0002662 A1 | 1/2006 | Manning et al. |
| 2006/0018604 A1 | 1/2006 | Bareel et al. |
| 2006/0089049 A1 | 4/2006 | Sedor |
| 2006/0115219 A1 | 6/2006 | Mudd et al. |
| 2006/0269194 A1 | 11/2006 | Luther et al. |
| 2007/0098331 A1 | 5/2007 | Mudd et al. |
| 2007/0223863 A1 | 9/2007 | Robertson et al. |
| 2007/0280599 A1 | 12/2007 | Faika et al. |
| 2008/0013889 A1 | 1/2008 | Milette |
| 2008/0069501 A1 | 3/2008 | Mudd et al. |
| 2008/0175540 A1 | 7/2008 | Zheng et al. |
| 2008/0175545 A1 | 7/2008 | Zheng et al. |
| 2008/0226236 A1 | 9/2008 | Pepin et al. |
| 2008/0260332 A1 | 10/2008 | Murano et al. |
| 2008/0317413 A1 | 12/2008 | Faika et al. |
| 2009/0214164 A1 | 8/2009 | Nakagawa |
| 2009/0290839 A1 | 11/2009 | Lin et al. |
| 2013/0071066 A1 | 3/2013 | Lu |

FOREIGN PATENT DOCUMENTS

| | | |
|---|---|---|
| CA | 2403634 A1 | 9/2002 |
| EP | 0 689 069 A1 | 12/1995 |
| EP | 0 762 558 B1 | 3/1997 |
| EP | 1 443 350 A2 | 8/2004 |
| JP | 2010-230862 | 10/2010 |
| WO | WO 95/35520 | 12/1995 |
| WO | 01/79904 A2 | 10/2001 |
| WO | WO 2005/101076 A1 | 10/2005 |

OTHER PUBLICATIONS

Invitation to Pay Additional Fees with Partial International Search mailed Feb. 27, 2012.

* cited by examiner

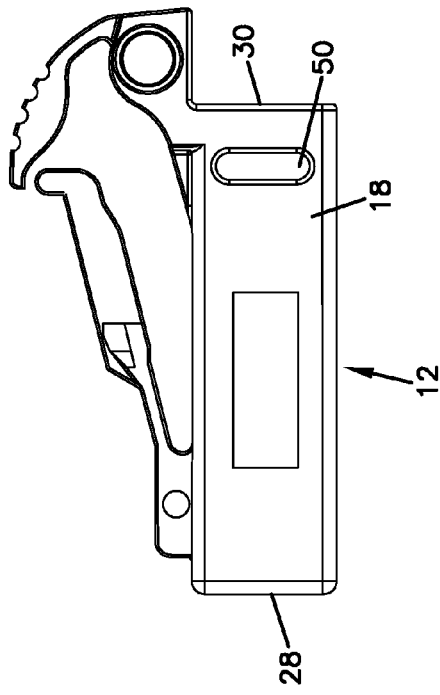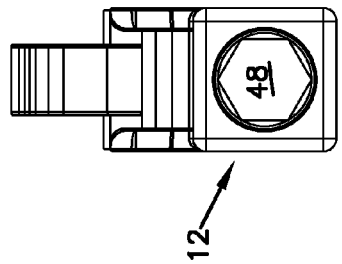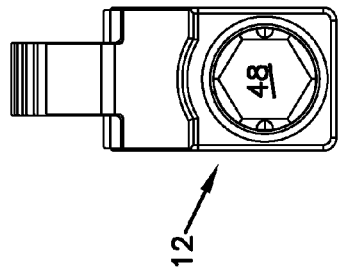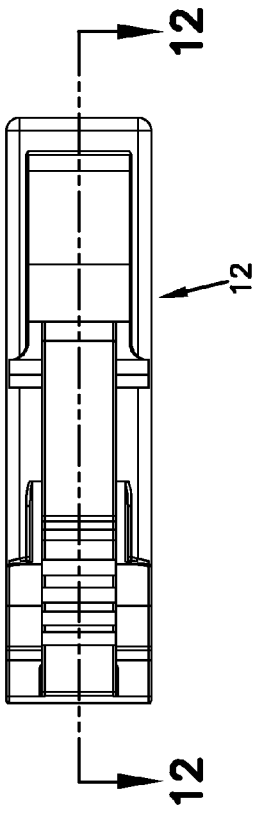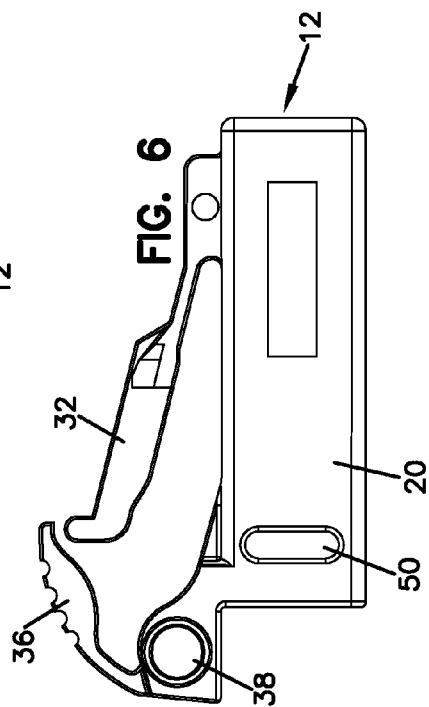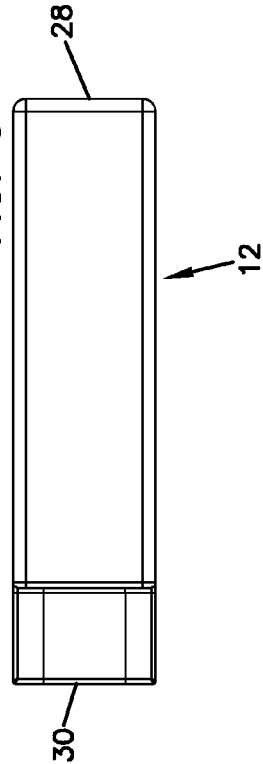

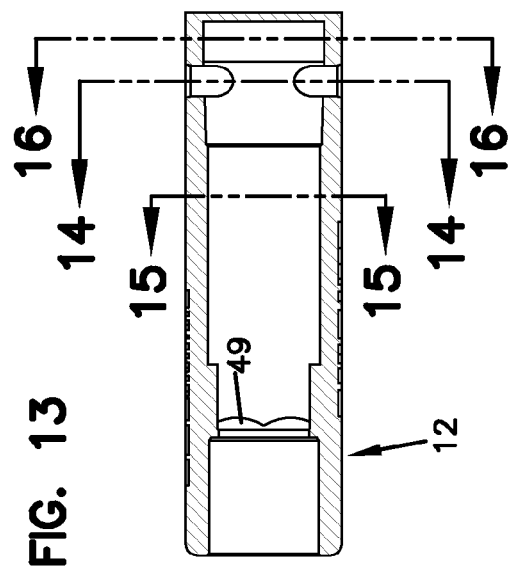
FIG. 13
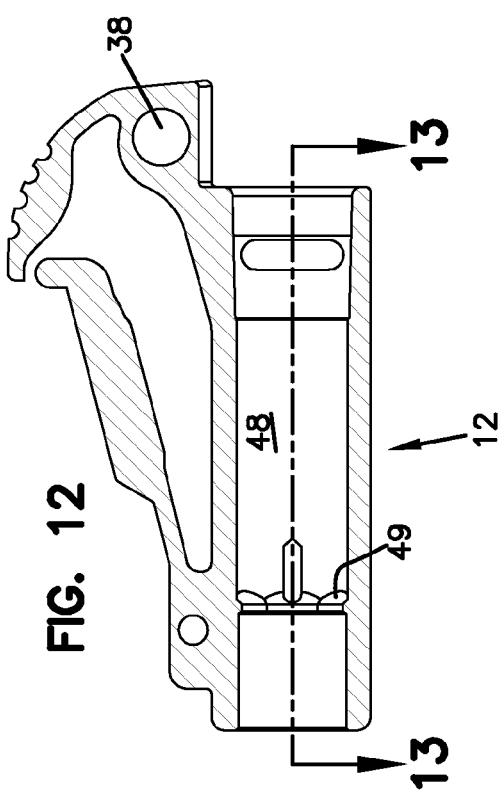
FIG. 12
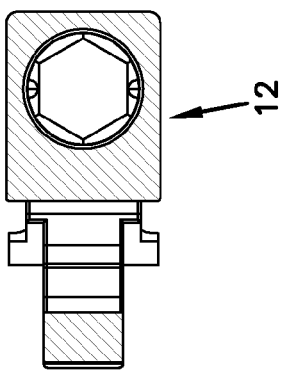
FIG. 16
FIG. 15
FIG. 14

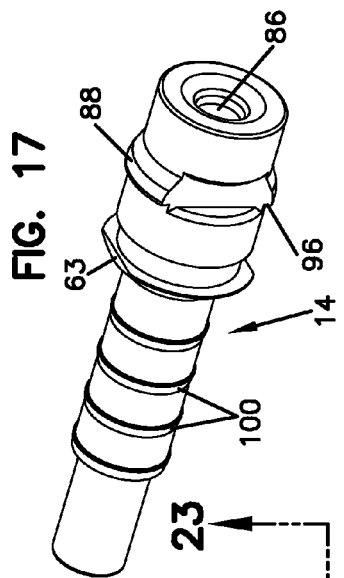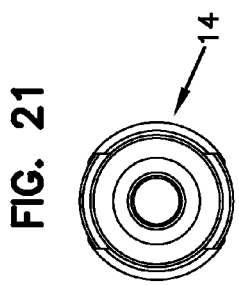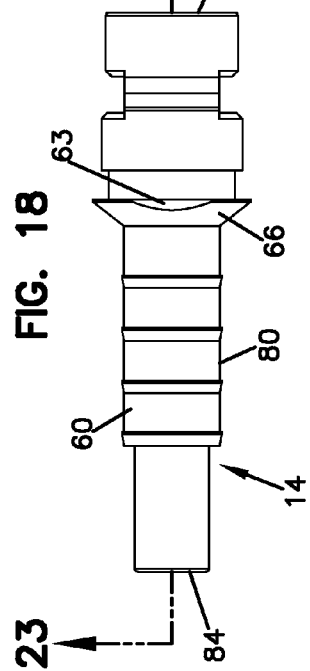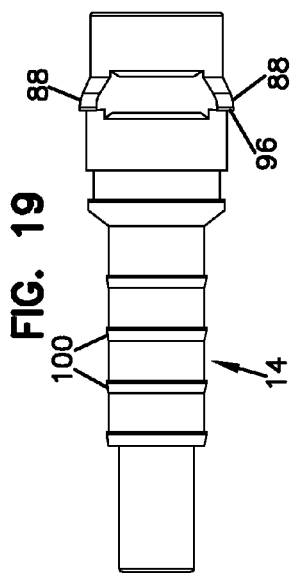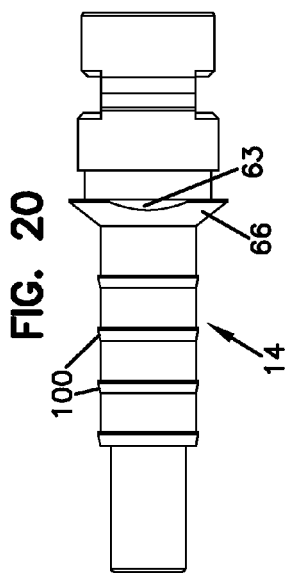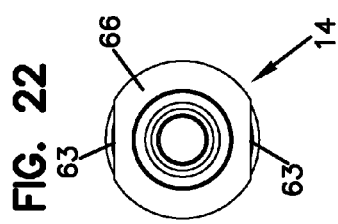

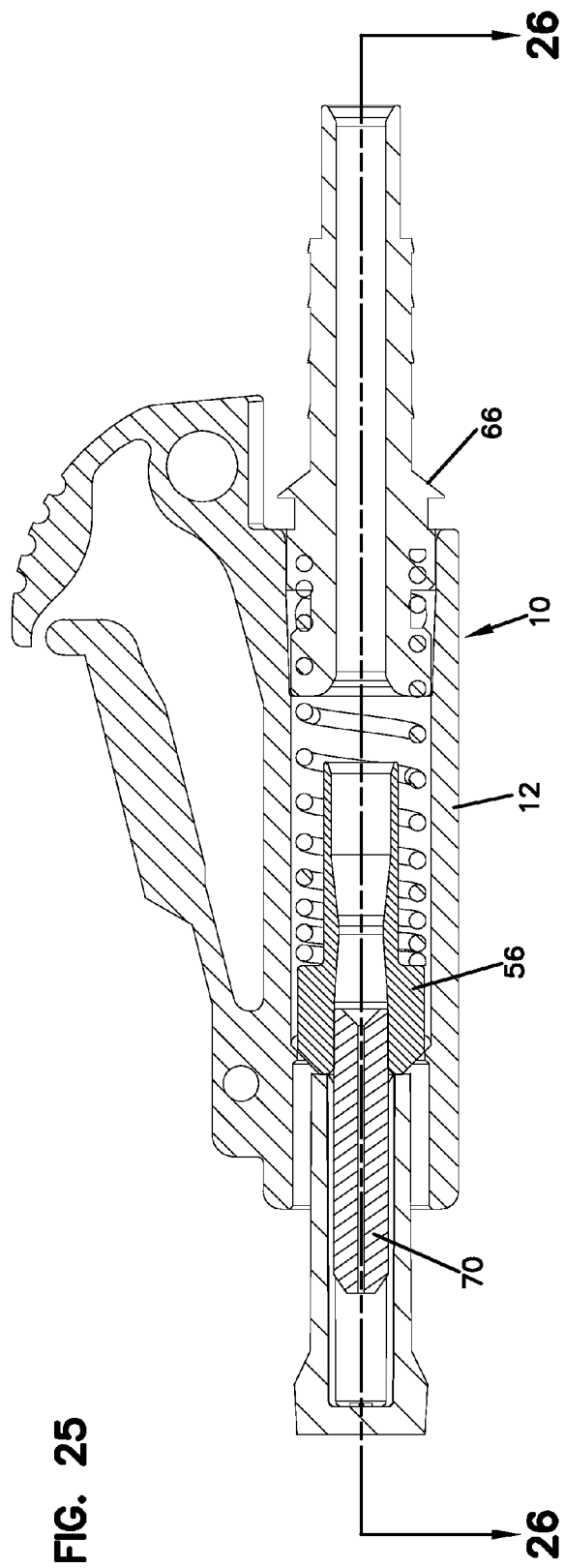
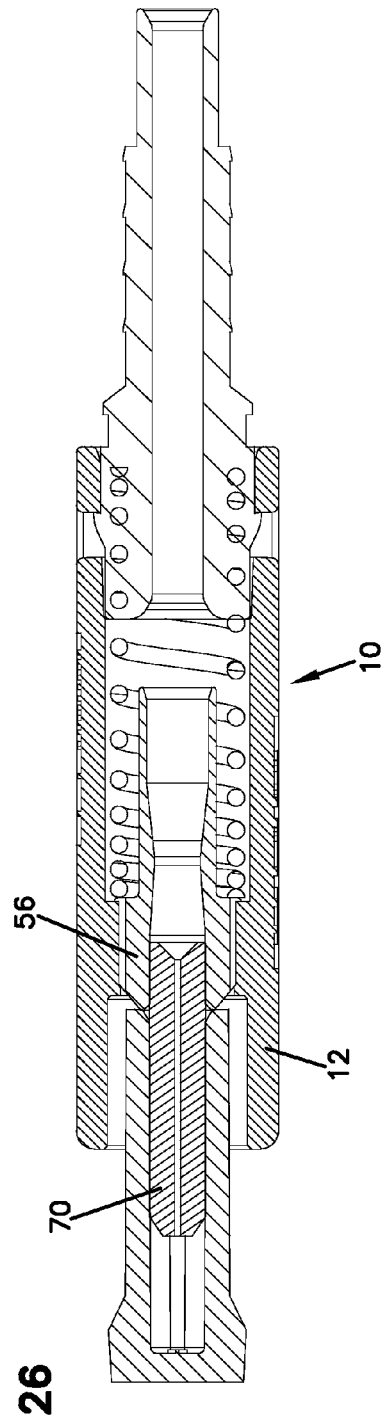
FIG. 25
FIG. 26

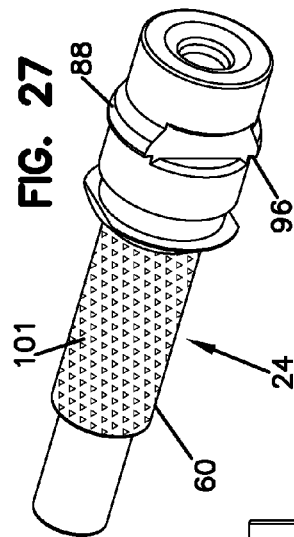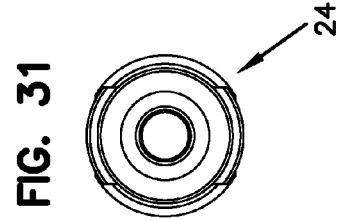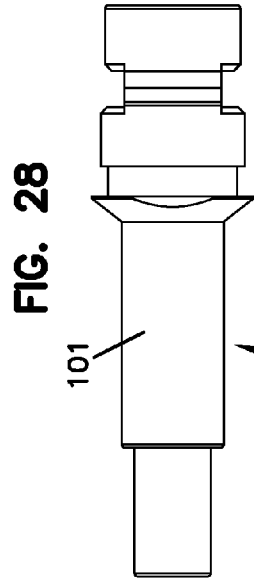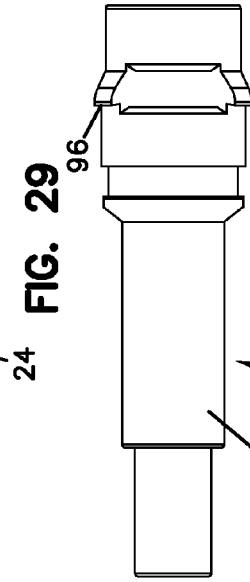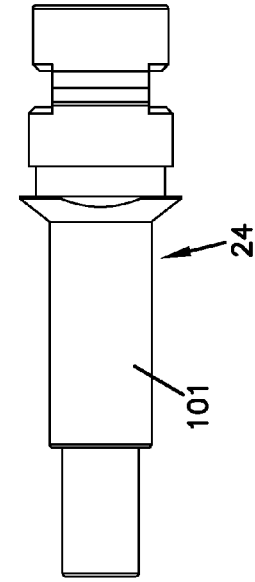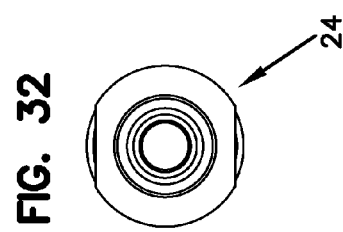

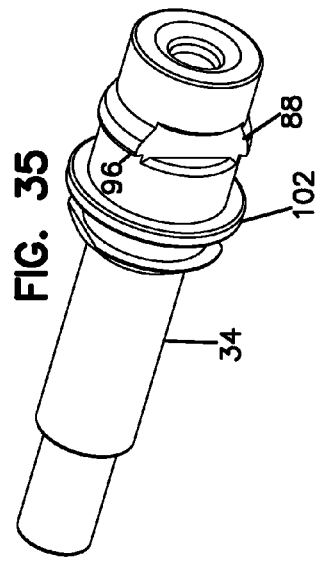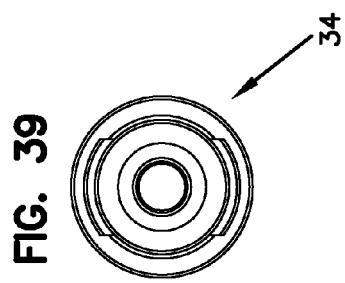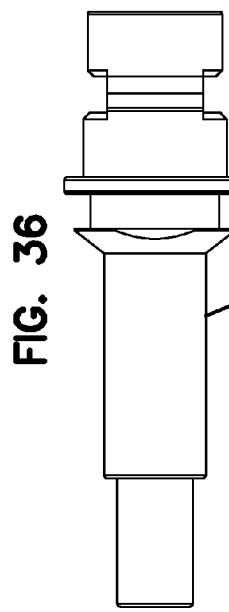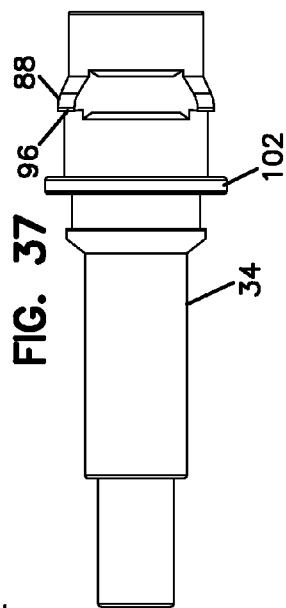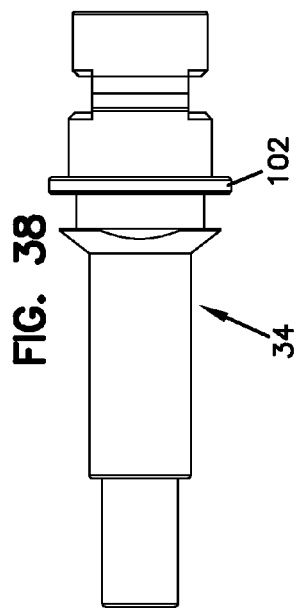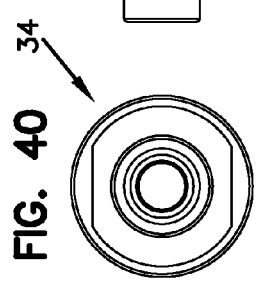

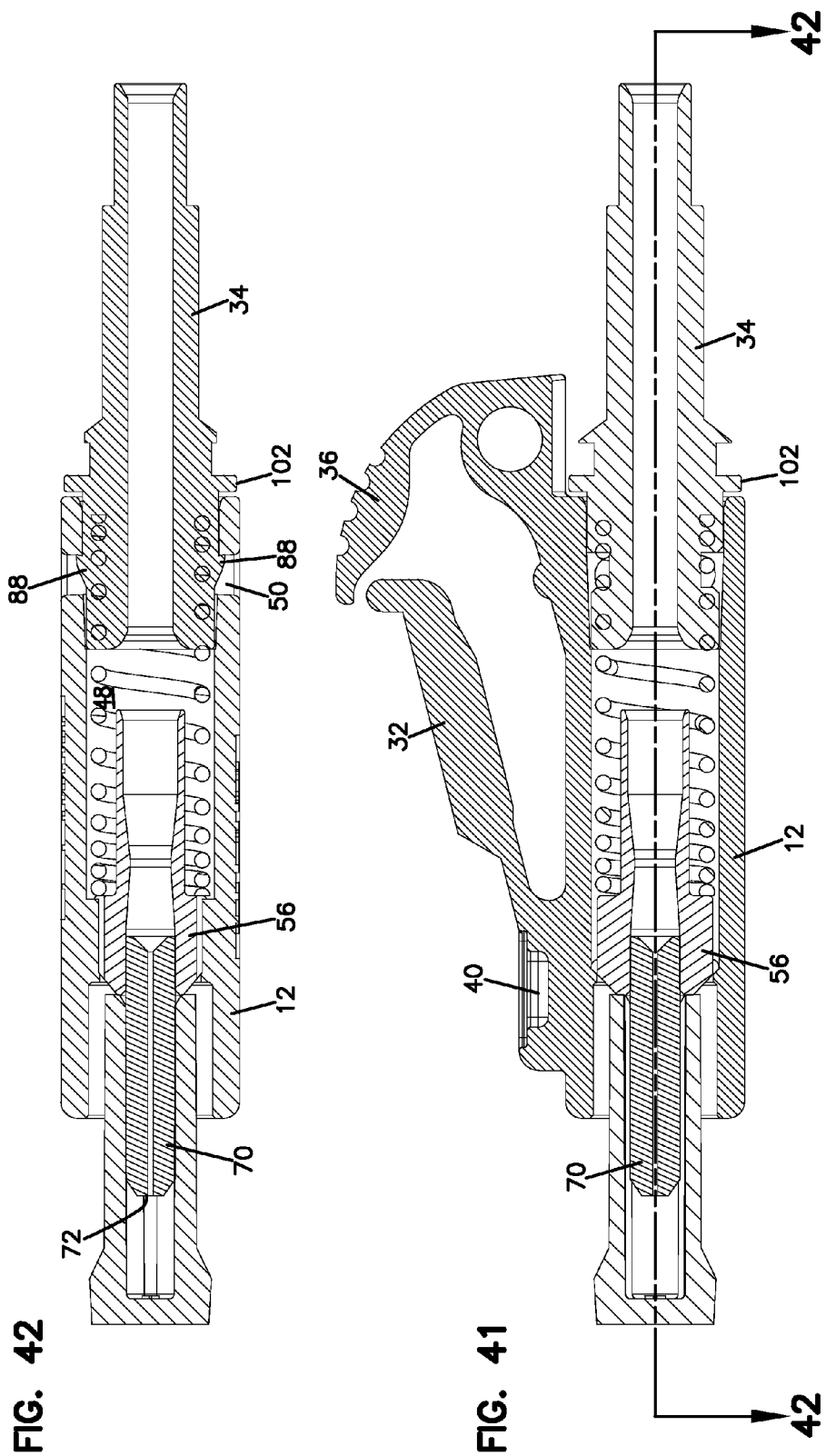

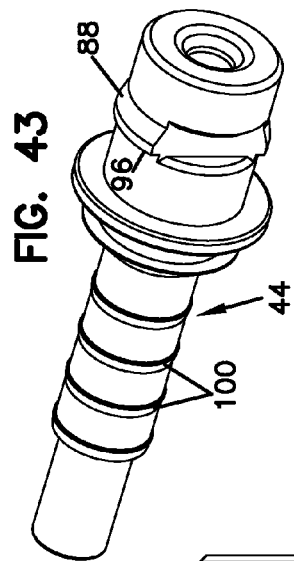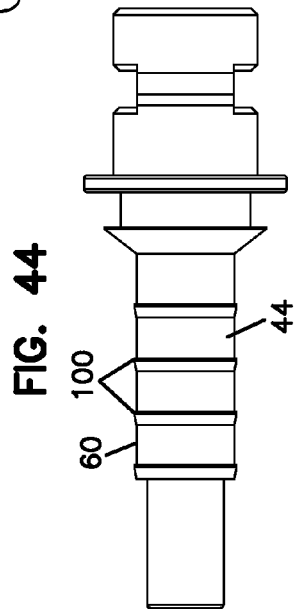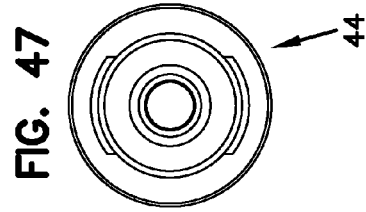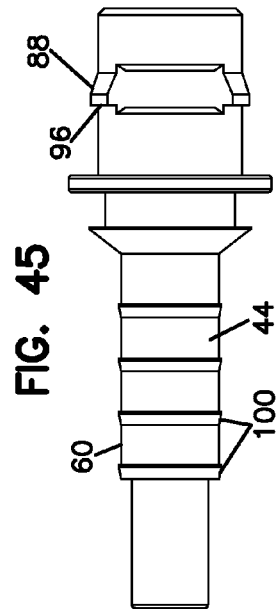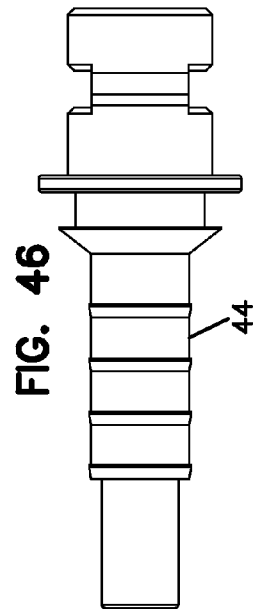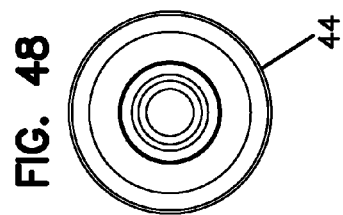

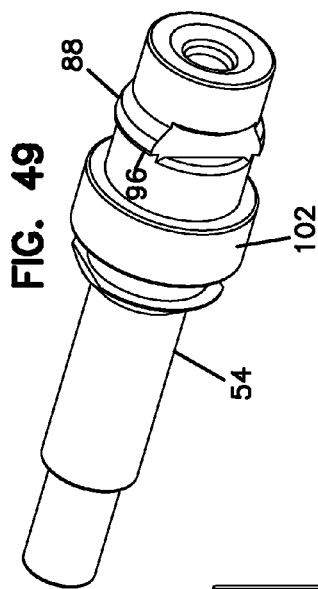
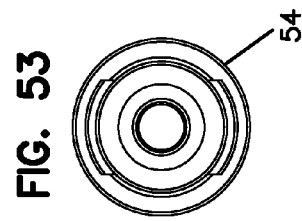
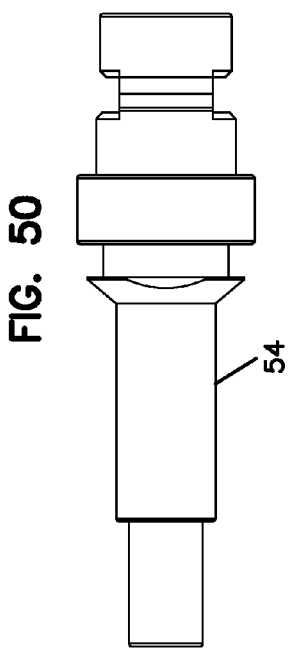
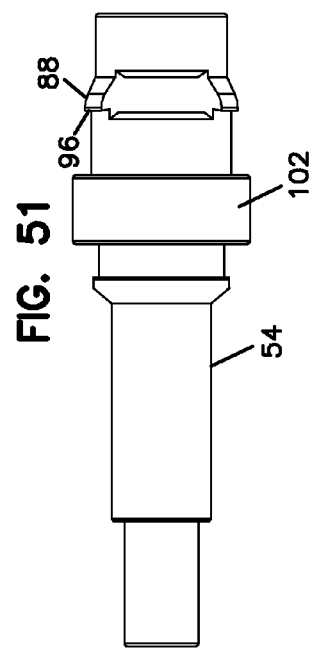
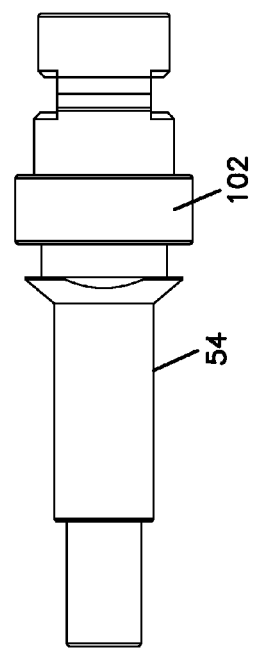
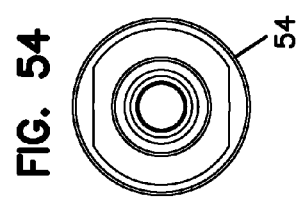

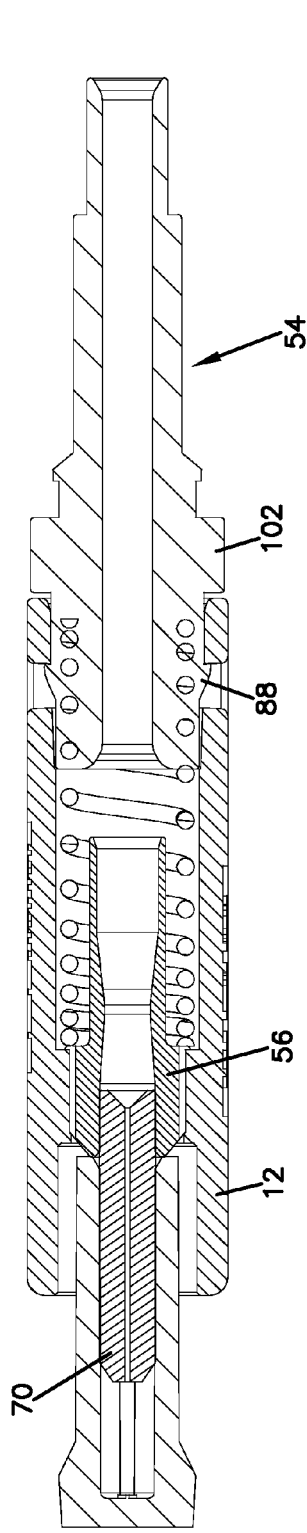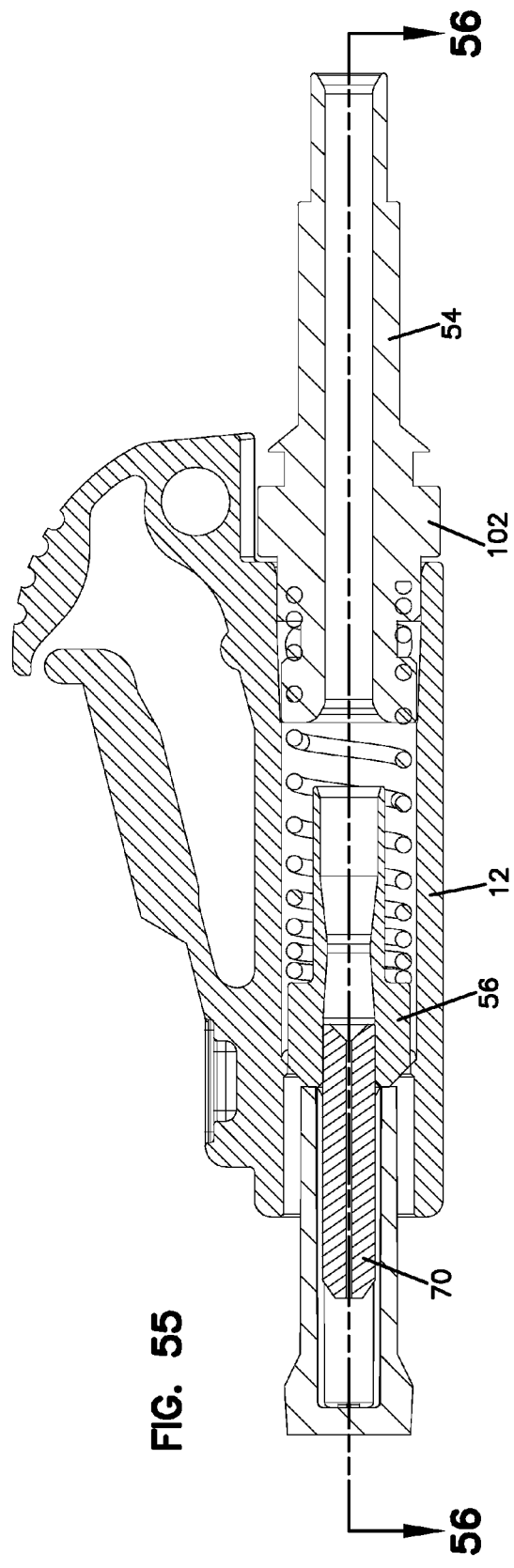
FIG. 56
FIG. 55

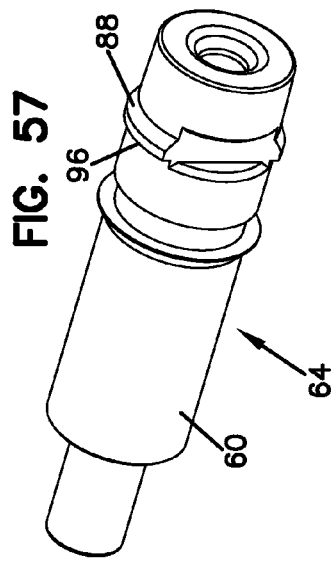
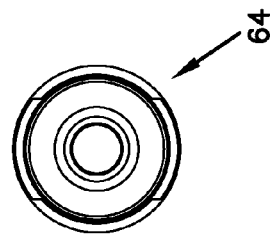
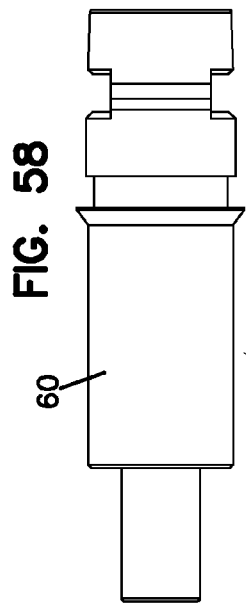
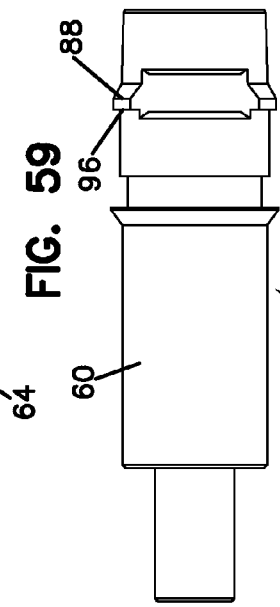
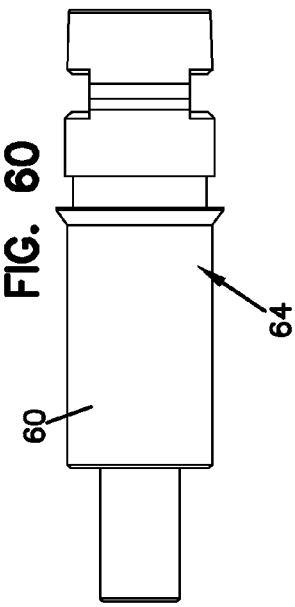
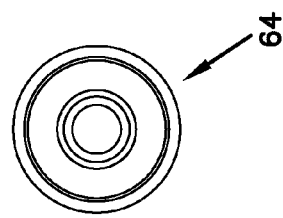

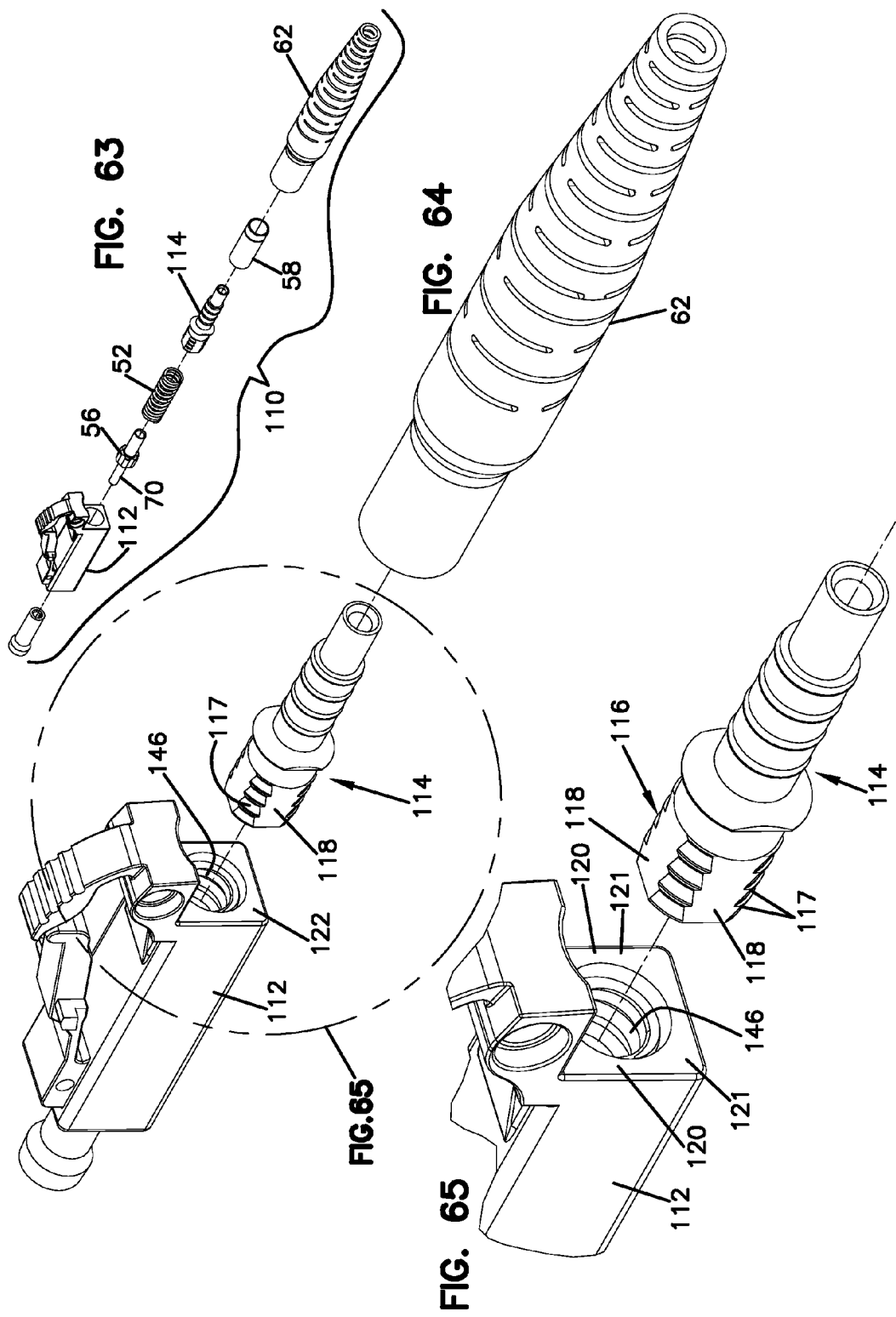

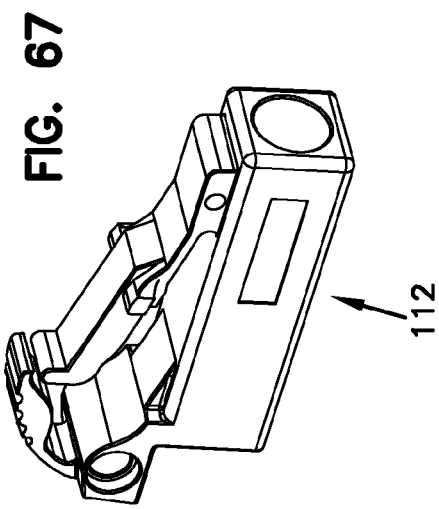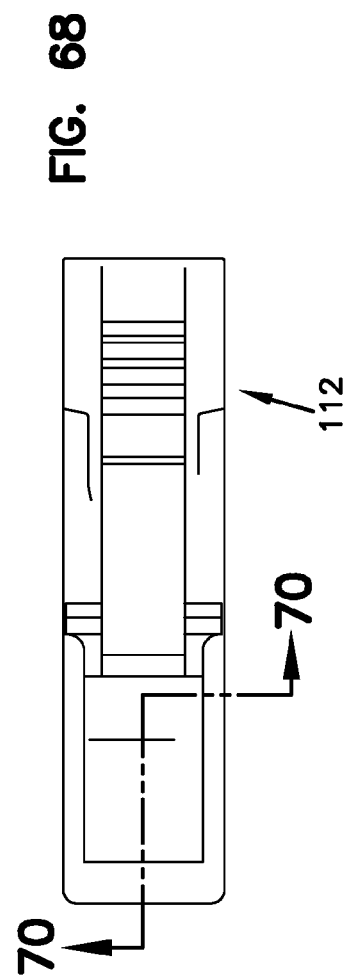

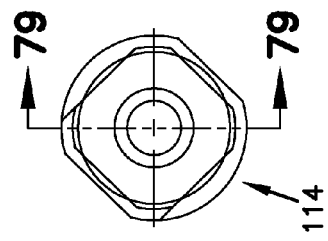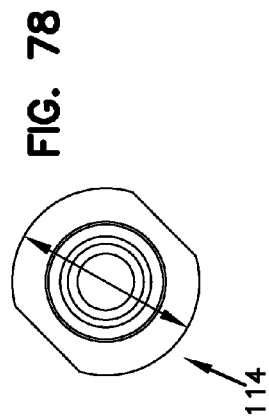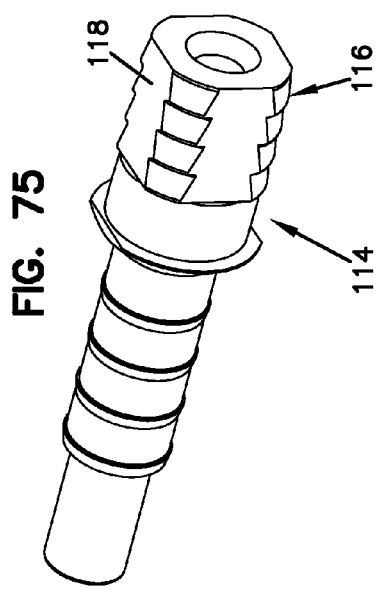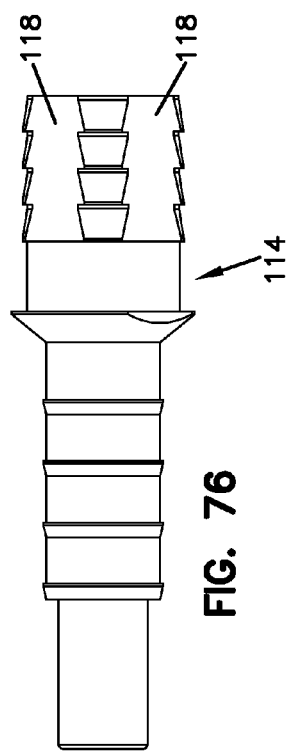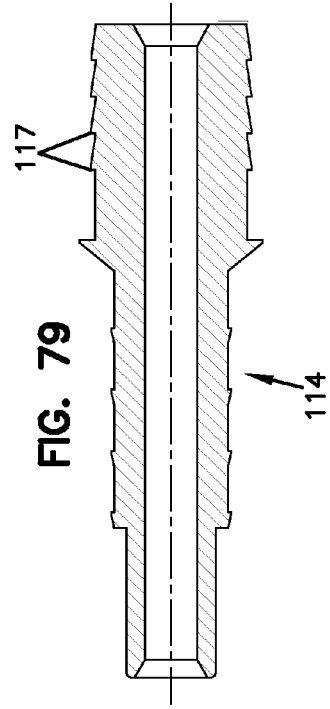

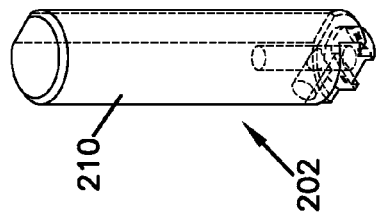
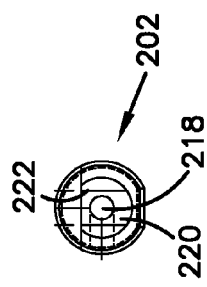
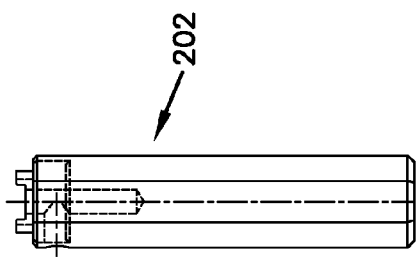
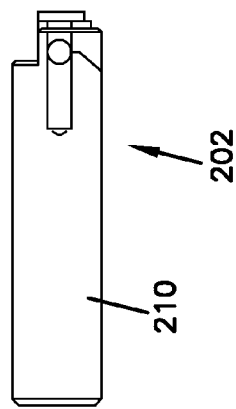

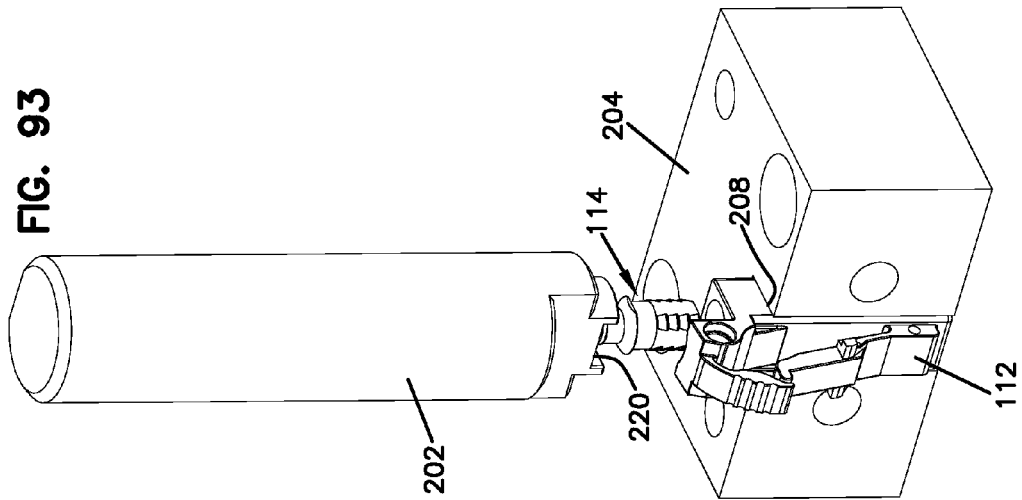
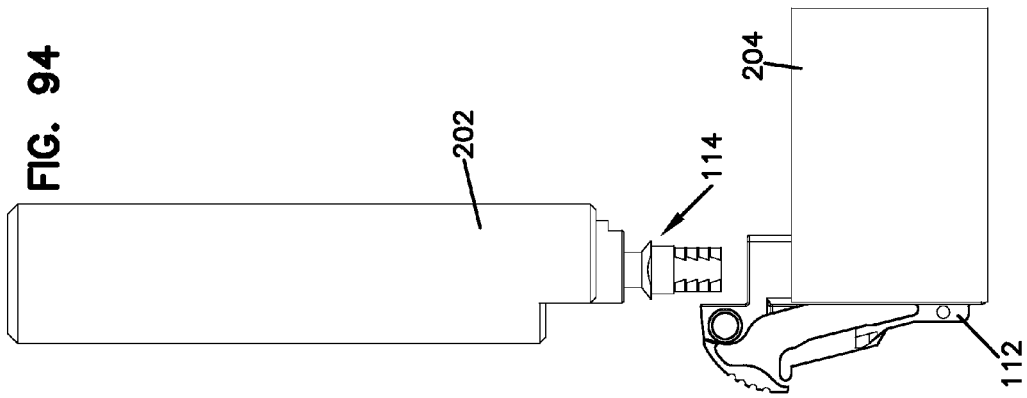
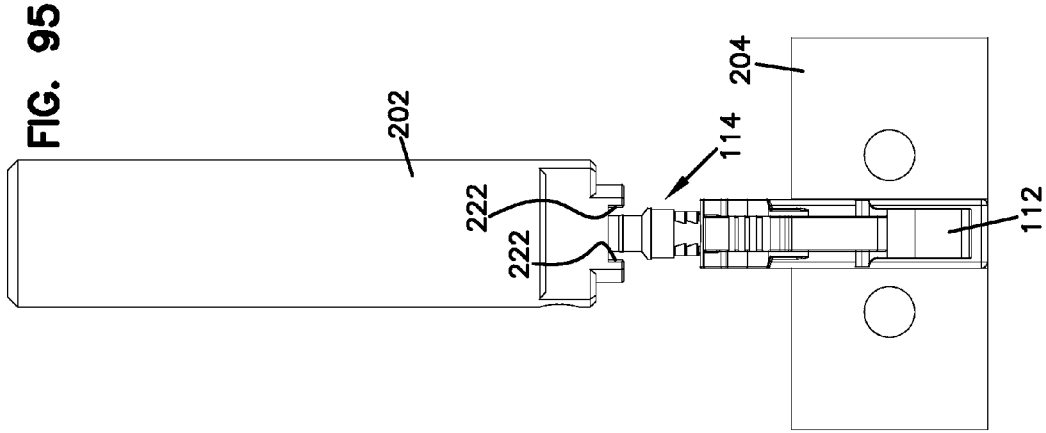

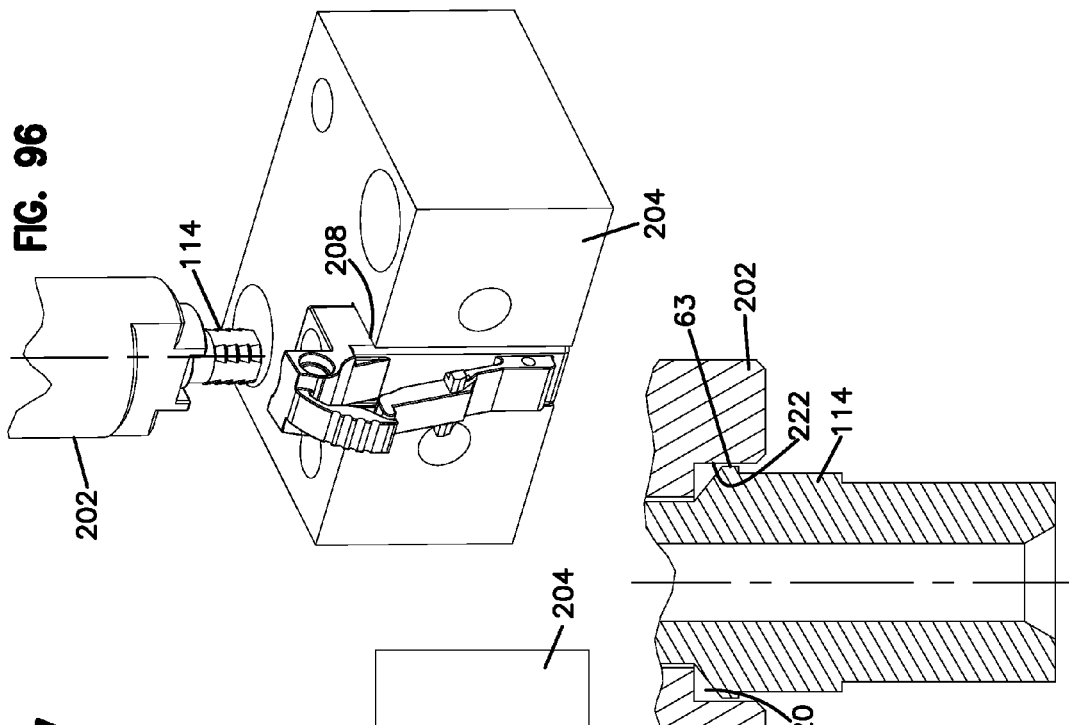
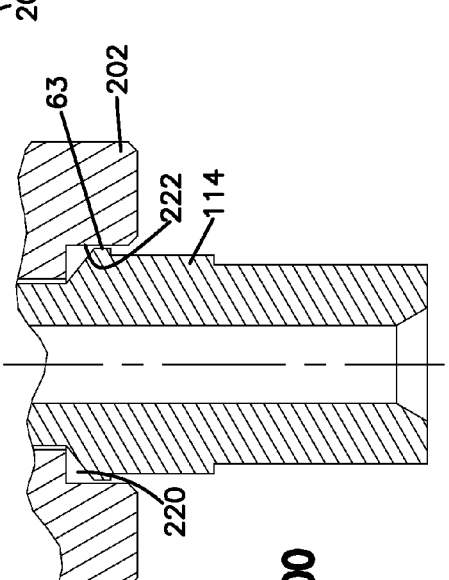
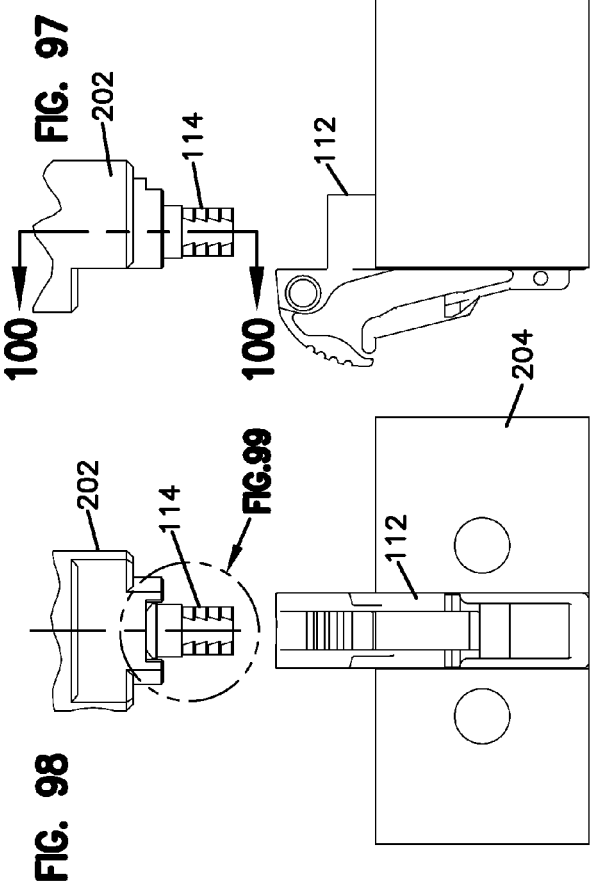
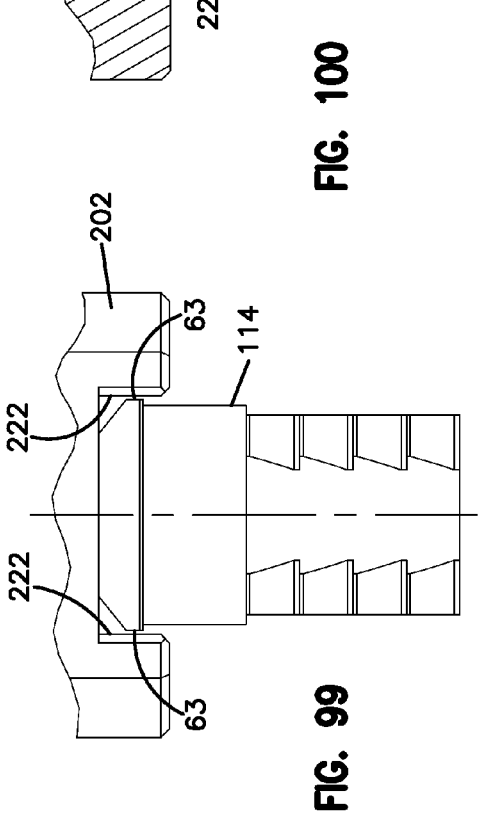

LC CONNECTOR AND METHOD OF ASSEMBLY

CROSS REFERENCE TO RELATED APPLICATION

This application claims the benefit of U.S. Provisional Patent Application Ser. No. 61/418,252, filed Nov. 30, 2010, which application is hereby incorporated by reference in its entirety.

TECHNICAL FIELD

The principles disclosed herein relate generally to connectors for terminating optical fibers and improved methods for assembly thereof.

BACKGROUND

LC connectors are standard industry connectors having generally fixed external size and geometry. However, the manner in which internal parts of LC connectors are conventionally designed and assembled make these types of connectors susceptible to certain problems, both in connector reliability and signal loss.

Optical connectors must withstand at least a certain minimum amount of side-loading in order to operate properly. As is well known in the art, when optical fibers are bent beyond a particular bending radius, signal loss occurs. Therefore, an optical connector needs sufficient side-loading capability in order to prevent the optical fibers housed therein from being bent beyond an allowable bending radius. Although there have been LC connector designs in the industry that have provided the desired side-loading capability and rigidity, such connectors still have been prone to cracking issues under higher loads. For example, in a two-piece assembly design, cracking tends to occur at the locations where the pieces of the connector are coupled together.

Accordingly, a need exists for an optical connector that has desirable side-loading and rigidity characteristics, that is relatively easy to manufacture and assemble, and that has improved features in aspects related to cracking.

SUMMARY

The principles disclosed herein relate to connectors for terminating optical fibers and improved methods for assembly thereof.

In one particular aspect, the disclosure is directed to a fiber optic connector that includes a front housing having sidewalls each defining a slot extending from an internal cavity to an exterior of the front housing and a rear insert with a pair of locking flanges positioned on opposite sides of the rear insert extending radially away, the locking flanges configured to snap-fit into the slots defined on the sidewalls, each locking flange defining a front face and a rear face, the radially outermost portion of the rear face defining an edge, the edge being the rearmost extending portion of the locking flange.

In another particular aspect, the disclosure is directed to a fiber optic connector that includes a front housing defining a top wall, a bottom wall, a first sidewall, a second sidewall, a front opening at a front end, a circular rear opening at a rear end, and an internal cavity extending therebetween. A rear insert including a generally cylindrical front portion is inserted into the front housing through the circular rear opening, the front portion defining at least one longitudinal flat configured to reduce the overall diameter of the generally cylindrical front portion configured to be inserted into the front housing through the circular rear opening.

According to yet another aspect of the disclosure, a method of assembling a fiber optic connector is described. The method includes providing a front housing including a body defining generally square cross-section, the body including a top wall, a bottom wall, a first sidewall, a second sidewall, a front opening at a front end, a circular rear opening at a rear end, and an internal cavity extending therebetween, providing a rear insert defining a front portion configured to be inserted into the front housing through the circular rear opening and a crimp portion for crimping a fiber optic cable carrying the optical fiber, the rear insert defining at least one flat on an exterior surface of the rear insert, fixing the front housing on a first clamp fixture, wherein the front housing is fixed both longitudinally and rotationally with respect to the first clamp fixture, fixing the rear insert on a second clamp fixture, wherein the rear insert is fixed longitudinally with respect to the second clamp fixture and is also fixed rotationally to the second clamp fixture via the flat, and moving at least one of the first and the second clamp fixtures toward the other to couple the rear insert to the front housing at a predetermined relative rotational orientation between the front housing and the rear insert.

BRIEF DESCRIPTION OF THE DRAWINGS

The accompanying drawings, which are incorporated in and constitute a part of the description, illustrate several aspects of the disclosure and together with the detailed description, serve to explain the principles of the disclosure. A brief description of the drawings is as follows:

FIG. 6 illustrates a left side view of the front housing of FIG. 2;

FIG. 7 illustrates a right side view of the front housing of FIG. 2;

FIG. 8 illustrates a top view of the front housing of FIG. 2;

FIG. 9 illustrates a bottom view of the front housing of FIG. 2;

FIG. 10 illustrates a rear view of the front housing of FIG. 2;

FIG. 11 illustrates a front view of the front housing of FIG. 2;

FIG. 12 illustrates a cross-section taken along line 12-12 of FIG. 8;

FIG. 13 illustrates a cross-section taken along line 13-13 of FIG. 12;

FIG. 14 illustrates a cross-section taken along line 14-14 of FIG. 13;

FIG. 15 illustrates a cross-section taken along line 15-15 of FIG. 13;

FIG. 16 illustrates a cross-section taken along line 16-16 of FIG. 13;

FIG. 17 is a front perspective view of a first embodiment of a rear insert of the various rear inserts that are capable of mating with the front housing to form the fiber optic connector shown in FIG. 1;

FIG. 18 is a top view of the rear insert of FIG. 17;
FIG. 19 is a side view of the rear insert of FIG. 17;
FIG. 20 is a bottom view of the rear insert of FIG. 17;
FIG. 21 is a front view of the rear insert of FIG. 17;
FIG. 22 is a rear view of the rear insert of FIG. 17;
FIG. 25 illustrates a cross-sectional view of a fully assembled fiber optic connector according to FIG. 1, wherein the first embodiment of the rear insert of FIG. 17 is used to mate with the front housing to assemble the fiber optic connector;
FIG. 26 illustrates a cross-section taken along line 26-26 of FIG. 25;
FIG. 27 is a front perspective view of a second embodiment of a rear insert of the various rear inserts that are capable of mating with the front housing to form the fiber optic connector shown in FIG. 1;
FIG. 28 is a top view of the rear insert of FIG. 27;
FIG. 29 is a side view of the rear insert of FIG. 27;
FIG. 30 is a bottom view of the rear insert of FIG. 27;
FIG. 31 is a front view of the rear insert of FIG. 27;
FIG. 32 is a rear view of the rear insert of FIG. 27;
FIG. 35 is a front perspective view of a third embodiment of a rear insert of the various rear inserts that are capable of mating with the front housing to form the fiber optic connector shown in FIG. 1;
FIG. 36 is a top view of the rear insert of FIG. 35;
FIG. 37 is a side view of the rear insert of FIG. 35;
FIG. 38 is a bottom view of the rear insert of FIG. 35;
FIG. 39 is a front view of the rear insert of FIG. 35;
FIG. 40 is a rear view of the rear insert of FIG. 35;
FIG. 41 illustrates a cross-sectional view of a fully assembled fiber optic connector according to FIG. 1, wherein the third embodiment of the rear insert of FIG. 35 is used to mate with the front housing to assemble the fiber optic connector;
FIG. 42 illustrates a cross-section taken along line 42-42 of FIG. 41;
FIG. 43 is a front perspective view of a fourth embodiment of a rear insert of the various rear inserts that are capable of mating with the front housing to form the fiber optic connector shown in FIG. 1;
FIG. 44 is a top view of the rear insert of FIG. 43;
FIG. 45 is a side view of the rear insert of FIG. 43;
FIG. 46 is a bottom view of the rear insert of FIG. 43;
FIG. 47 is a front view of the rear insert of FIG. 43;
FIG. 48 is a rear view of the rear insert of FIG. 43;
FIG. 49 is a front perspective view of a fifth embodiment of a rear insert of the various rear inserts that are capable of mating with the front housing to form the fiber optic connector shown in FIG. 1;

FIG. 50 is a top view of the rear insert of FIG. 49;
FIG. 51 is a side view of the rear insert of FIG. 49;
FIG. 52 is a bottom view of the rear insert of FIG. 49;
FIG. 53 is a front view of the rear insert of FIG. 49;
FIG. 54 is a rear view of the rear insert of FIG. 49;
FIG. 55 illustrates a cross-sectional view of a fully assembled fiber optic connector according to FIG. 1, wherein the fourth embodiment of the rear insert of FIG. 49 is used to mate with the front housing to assemble the fiber optic connector;
FIG. 56 illustrates a cross-section taken along line 56-56 of FIG. 55;
FIG. 57 is a front perspective view of a sixth embodiment of a rear insert of the various rear inserts that are capable of mating with the front housing to form the fiber optic connector shown in FIG. 1;
FIG. 58 is a top view of the rear insert of FIG. 57;
FIG. 59 is a side view of the rear insert of FIG. 57;
FIG. 60 is a bottom view of the rear insert of FIG. 57;
FIG. 61 is a front view of the rear insert of FIG. 57;
FIG. 62 is a rear view of the rear insert of FIG. 57;
FIG. 63 illustrates an exploded view of a second embodiment of a fiber optic connector in accordance with the present disclosure;
FIG. 64 illustrates a partial exploded view of the fiber optic connector of FIG. 63;
FIG. 65 illustrates a close-up view of a portion of the fiber optic connector of FIG. 64;
FIG. 67 is a left front perspective view of the front housing of FIG. 66;
FIG. 68 is a top view of the front housing of FIG. 66;
FIG. 75 illustrates a front perspective view of a rear insert of a second embodiment of a fiber optic connector according to the disclosure, the rear insert configured to mate with the front housing of FIG. 66;
FIG. 76 is a side view of the rear insert of FIG. 75;
FIG. 77 is front view of the rear insert of FIG. 75;
FIG. 78 is a rear view of the rear insert of FIG. 75;
FIG. 79 is a cross-section taken along line 79-79 of FIG. 77;
FIG. 81 is a perspective view of a collet of the assembly press of FIG. 80;
FIG. 82 is a side view of the collet of FIG. 81;
FIG. 83 is a top view of the collet of FIG. 81;
FIG. 84 is a front view of the collet of FIG. 81.

FIG. 93 illustrates a perspective view of the rear insert of the second embodiment of the fiber optic connector partially inserted into the collet of the assembly press and the front housing of the second embodiment of the fiber optic connector fully inserted into the base press of the assembly press for the assembly operation;

FIG. 94 illustrates a side view of the rear insert of the second embodiment of the fiber optic connector partially inserted into the collet of the assembly press and the front housing of the second embodiment of the fiber optic connector fully inserted into the base press of the assembly press for the assembly operation;

FIG. 95 illustrates a front view of the rear insert of the second embodiment of the fiber optic connector partially inserted into the collet of the assembly press and the front housing of the second embodiment of the fiber optic connector fully inserted into the base press of the assembly press for the assembly operation;

FIG. 96 illustrates a perspective view of the rear insert of the second embodiment of the fiber optic connector fully inserted into the collet of the assembly press and the front housing of the second embodiment of the fiber optic connector fully inserted into the base press of the assembly press for the assembly operation;

FIG. 97 illustrates a side view of the rear insert of the second embodiment of the fiber optic connector fully inserted into the collet of the assembly press and the front housing of the second embodiment of the fiber optic connector fully inserted into the base press of the assembly press for the assembly operation;

FIG. 98 illustrates a front view of the rear insert of the second embodiment of the fiber optic connector fully inserted into the collet of the assembly press and the front housing of the second embodiment of the fiber optic connector fully inserted into the base press of the assembly press for the assembly operation;

FIG. 99 is a close-up view of a portion of the assembly press showing the rear insert of FIGS. 75-79 fully inserted into the collet of the assembly press; and FIG. 100 is a cross-section taken along line 100-100 of FIG. 97.

DETAILED DESCRIPTION

The inventive aspects of the disclosure will now be described by reference to the several drawing figures.

Figure 1:
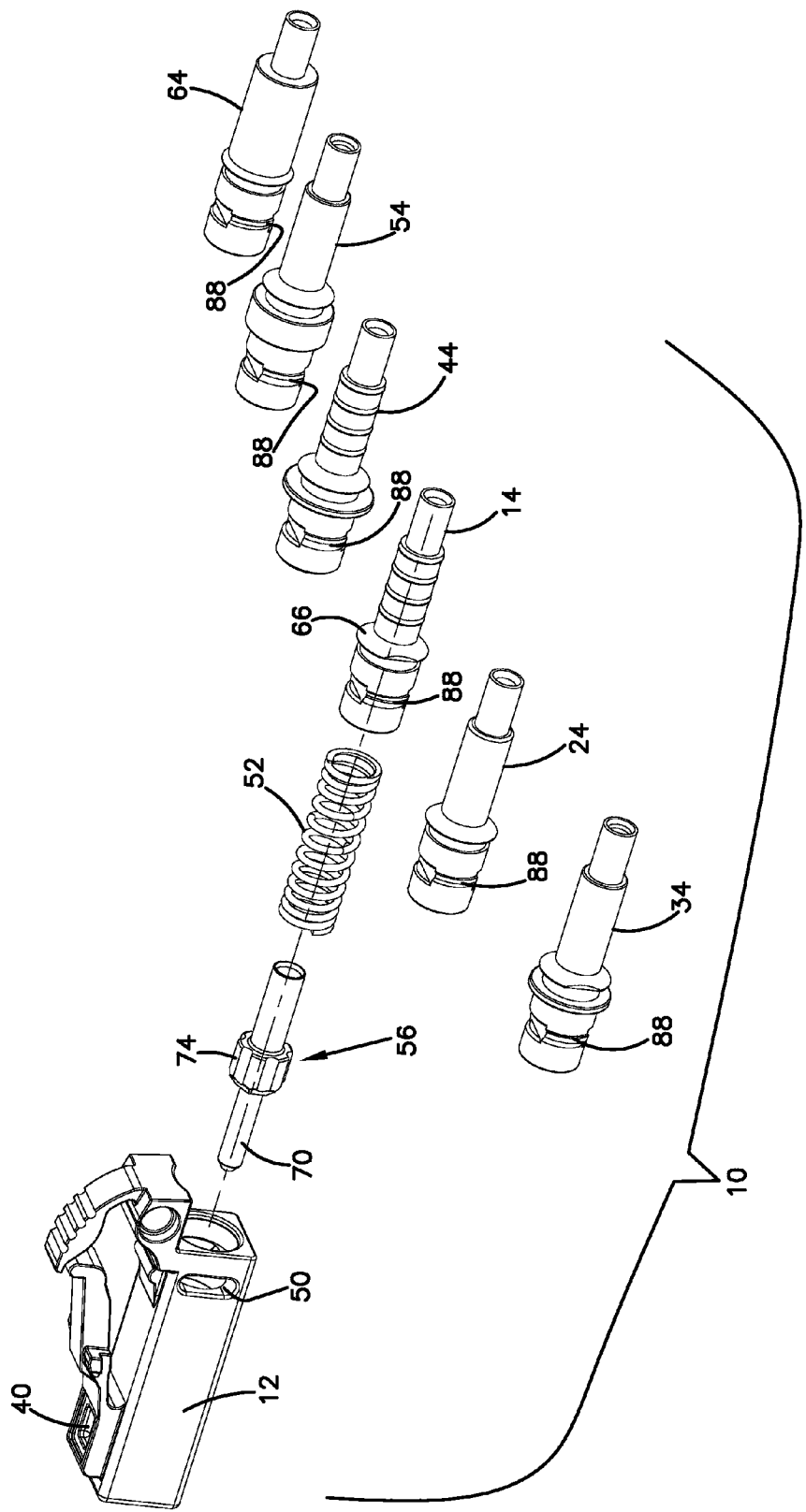
FIG. 1 illustrates an exploded view of a first embodiment of a fiber optic connector with a front housing and with various embodiments of rear inserts that are capable of mating with the front housing to form the fiber optic connector.
Figure 5:
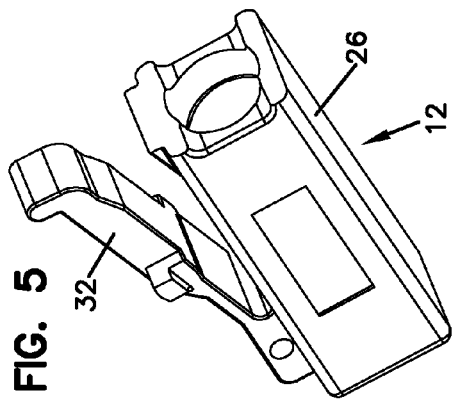
FIG. 5 illustrates a rear perspective view of the front housing of FIG. 2, with a portion of the front housing cut-away.
Figure 2:
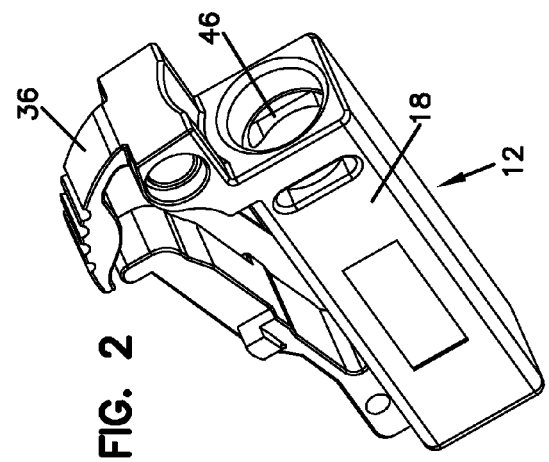
FIG. 2 is a rear perspective view of the front housing of the fiber optic connector of FIG. 1.
Figure 3:
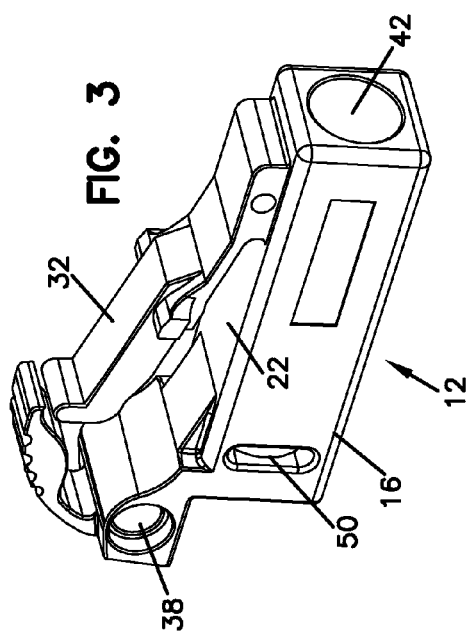
FIG. 3 is a front perspective view of the front housing of FIG. 2.
Figure 4:
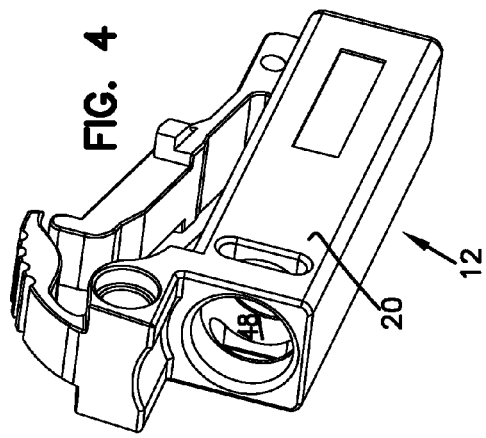
FIG. 4 is another rear perspective view of the front housing of FIG. 2.

FIG. 1 illustrates an exploded view of a first embodiment of a fiber optic connector 10 with a front housing 12 and with various embodiments of rear inserts 14, 24, 34, 44, 54, 64 that are capable of mating with the front housing 12 to form the fiber optic connector 10, the first embodiment of the fiber optic connector 10 having features that are examples of inventive aspects in accordance with the disclosure. The fiber optic connector 10 depicted herein is configured as an LC connector, and, when assembled, is configured to be used in fiber optic equipment having a standard LC footprint. It will be understood that other types or standards of fiber optic connectors may be used to practice the inventive aspects of the present disclosure.

The front housing 12 of the fiber optic connector 10 is generally illustrated in FIGS. 2-16. Even though the same front housing 12 can be used with a number of different rear inserts, each rear insert is mated with the front housing 12 in a similar manner and serves similar functionality in the fiber optic connector 10.

The front housing 12 of the fiber optic connector 10 defines a body 16 with opposing sidewalls 18, 20, a top wall 22, a bottom wall 26, a front end 28 and a rear end 30. According to certain embodiments, the front housing 12 may be formed from a molded material, including various polymers. The front housing 12 defines a latch 32 extending from the top wall 22 of the front housing 12 toward the rear end 28, the latch 32 extending at an acute angle with respect to the top wall 22 of the front housing 12. The front housing 12 also includes a latch trigger 36 that extends from the rear end 30 of the front housing 12 toward the front end 28. The latch trigger 36 also extends at an acute angle with respect to the top wall 22. The latch trigger 36 is configured to come into contact with the latch 32 for flexibly moving the latch 32 downwardly.

As is known in the art, when the fiber optic connector 10 is placed in an adapter for optically coupling light from two optical fibers together, the latch 32 functions to lock the fiber optic connector 10 in place within the adapter. The fiber optic connector 10 may be removed from the adapter by depressing the latch trigger 36, which causes the latch 32 to be pressed in a downward direction, freeing the catch portions 33 of the latch 32 from the fiber optic adapter.

The portion of the front housing 12 from where the latch trigger 36 extends defines a pin hole 38. The pin hole 38 is configured to receive a pin for forming a duplex connector by coupling two simplex connectors 10 on a side-by-side orientation.

According to certain examples, the portion of the front housing 12 from where the latch 32 extends may define a recess 40, as depicted in FIG. 1, for housing electronic components such as a contact set and/or memory storage. Such electronic components may include an electronic memory chip, a printed circuit board, etc. Further details relating to some such electronic components and how they may be used within a fiber optic system including the fiber optic connector 10 of the present disclosure is described in U.S. Provisional Patent Application Ser. No. 61/303,961, filed on Feb. 12, 2010 and U.S. Provisional Patent Application Ser. No. 61/413,828, filed on Nov. 15, 2010, the entire disclosures of which are incorporated herein by reference.

The front housing 12 may also be provided without the recess 40 for housing the electronic components.

The front housing 12 defines a front opening 42, a rear opening 46, and an internal cavity 48 extending therebetween. The front opening 42 and the rear opening 46 are circular in shape. The front housing 12 defines a slot 50 on each of the sidewalls 18, 20 of the body 16. The slots 50 extend from an exterior of the body 16 to the internal cavity 48 within the body 16. As will be discussed in further detail below, the slots 50 are configured for latching the rear inserts to the front housing 12 with a snap-fit interlock.

The rear insert 14, 24, 34, 44, 54, 64 is coupled to the front housing 12 to capture a spring 52 and a ferrule hub 56 therewithin. When the fiber optic connector 10 is assembled, a terminal end of an optical fiber extends through the front opening 42. The optical fiber is an extension of an optical fiber carried in an optical cable terminated to the connector 10.

Within the connector 10, the fiber passes through a crimp sleeve 58 (an example of which is shown in FIG. 63) and the rear insert before being led to the internal cavity 48 of the front housing 12.

Each of the illustrated and described rear inserts 14, 24, 34, 44, 54, 64 includes a rear portion 60 that defines a crimp zone for crimping on the cable's reinforced kevlar layer as is generally known in the art. A strain relief boot 62 (an example of which is shown in FIGS. 63-64) surrounds the rear portion 60 and the cable. Each of the illustrated and described rear inserts 14, 24, 34, 44, 54, 64 includes a boot flange 66 for receiving a lip defined at a front opening of the strain relief boot 62, as is generally known in the art. The strain relief boot 62 is snap-fit onto the boot flange 66.

The internal cavity 48 permits small amounts of displacement of fiber as opposing fibers abut each other as opposing connectors 10 are optically coupled. The ferrule 70 is axially positioned in cavity 48 and protrudes beyond the front end 28 through the front opening 42. The ferrule 70 is contained within the hub 56 that is biased from the rear insert by the spring 52. The optical fiber passes through the ferrule 70. Opposing ferrules 70 are aligned axially when opposing connectors 10 are brought together.

An end face 72 of the ferrule 70 comprises a polished surface that abuts an end face of another ferrule when the fiber optic connector 10 is disposed in an adapter that optically couples the optical fiber disposed within the ferrule 70 with another optical fiber of another fiber optic connector 10 that is also disposed within the adapter. The ferrule 70 may be attached to the ferrule hub 56 by a variety of methods including a press-fit.

A front portion 74 of the hub 56 from which the ferrule 70 protrudes may define a cross-section with dimensions configured to fit a recess 49 defined by the internal cavity 48 within the front housing 12. In the depicted embodiment, the front portion 74 of the hub 56 defines a generally hexagonal shape that is seated within a hexagonal recess 49 formed in the front housing 12, wherein the recess 49 prevents the ferrule hub 56 from rotating.

As is known in the art, when the front portion 74 of the hub 56 and the recess 49 within the front housing 12 define intermating shapes that provide discrete radial interlocking positions, the fiber optic connector 10 may be provided with tuning capability. The intermating shapes between the recess 49 of the front housing 12 and the front portion 74 of the hub 56 allow the ferrule hub 56 to be pulled back and rotated within the interior of the housing 12 and locked at discrete radial locking positions for tuning purposes.

Once the ferrule hub 56 including the ferrule 70 and the spring 52 have been placed in the front housing 12, the rear insert 14, 24, 34, 44, 54, 64 is placed in contact with an end of the compression spring 52. The insert acts as a strength member and holds the ferrule hub 56 and spring 52 in place within the front housing 12, while also enhancing the side-loading capacity of the connector 10.

A first embodiment of a rear insert 14 of the various rear inserts that are capable of mating with the front housing 12 to form the fiber optic connector 10 is illustrated in FIGS. 17-24.

The rear insert 14 includes a body 80 defining a first end 82, a second end 84, and a throughhole 86 extending therebetween. The optical fiber to be led to the ferrule 70 is first passed through the rear insert 14 before being inserted into the ferrule hub 56. In addition to a crimp portion 60 and a boot flange 66, the rear insert 14 defines a pair of locking flanges 88 positioned on radially opposite sides of the body 80. As noted previously, the locking flanges 88 are sized, shaped, and positioned to interlock with the slots 50 defined on the sidewalls 18, 20 of the front housing 12.

Figure 23:
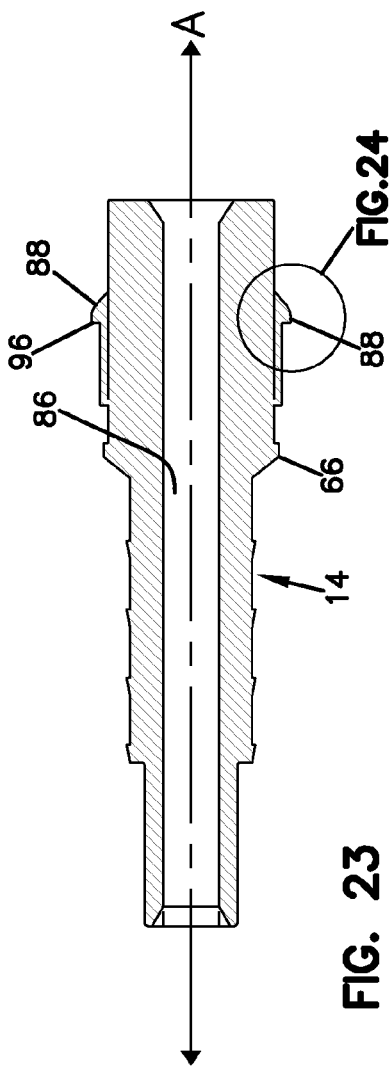
FIG. 23 is a cross-section taken along line 23-23 of FIG. 18.
Figure 24:
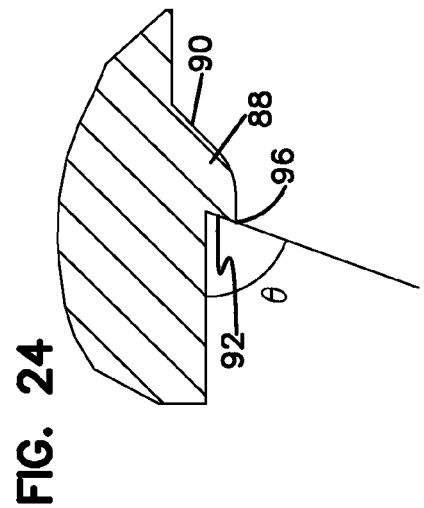
FIG. 24 is a close-up view of a portion of the rear insert of FIG. 23.

As shown in the cross-sectional view of FIG. 23 and the close-up view of FIG. 24, the flanges 88 define a front face 90 and a rear face 92. The front face 90 of the flanges 88 include a generally rounded profile for facilitating insertion into the rear opening 46 of the front housing 12 and into the slots 50. The generally rounded profile of the front face 90 causes the circular rear opening 46 of the front housing 12 to flex radially outwardly in receiving the rear insert 14. Once the locking flanges 88 of the rear insert 14 are snapped into the slots 50, the circular rear opening 46 flexes back inwardly.

Figure 26A:
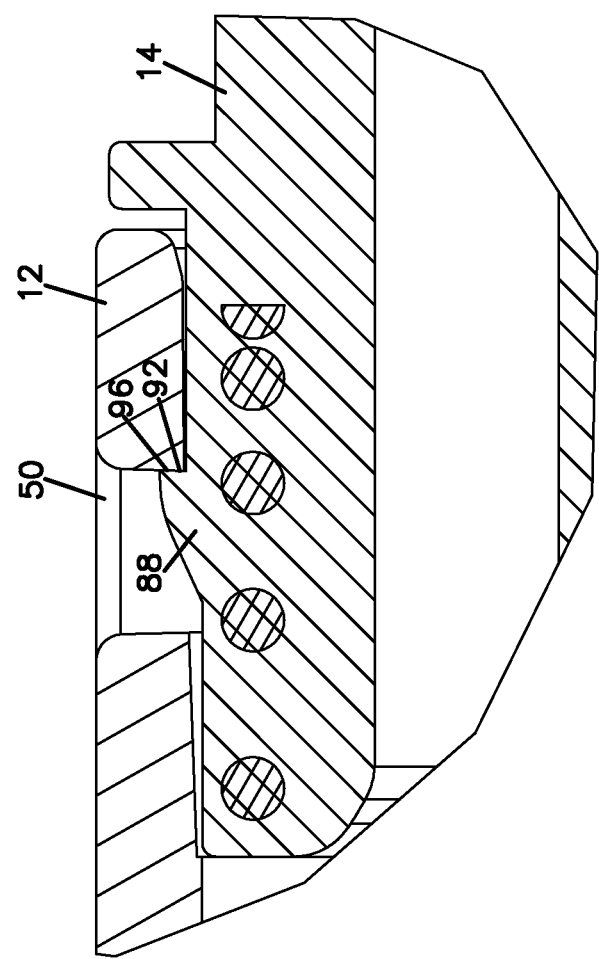
FIG. 26A is a close-up view of a portion of the rear insert and the front housing shown in FIG. 26.

When the rear face 92 of the locking flanges 88 is viewed from a cross-sectional view as in FIGS. 23 and 24, the rear face 92 of the locking flanges 88 is generally angled at an acute angle θ rearwardly with respect to a longitudinal axis A of the rear insert 14, wherein the radially outermost portion 94 of the rear face 92 comes to a point or edge 96. The point or edge 96 is the rearmost extending part of the flanges 88. The point or edge 96 formed by the rear face 92, thus, defines a "fish hook" profile. The fish hook profile is configured to bite into the material of the front housing 12 within the slots 50 if there is any side-loading of the connector 10. The biting of the rear face 92 of the locking flanges 88 into the material of the front housing 12 limits rotation of the rear insert 14 with respect to the front housing 12. The greater the side-loading stress put on the fiber optic connector 10, the further the point or edge 96 of the fish hook profile of the flange 88 will tend to bite into the material of the front housing 12. As opposed to a flat faced flange, the interaction between the fish hook profile of the flange 88 and the material of the front housing 12 tends to reduce the overall stress on the body 16 of the front housing 12. Please refer to FIGS. 25-26 for an illustration of the first embodiment of the rear insert 14 snapped within the front housing 12.

The crimp portion 60 of the rear insert 14 includes a plurality of crimp teeth 100 for crimping on the cable's reinforced Kevlar layer via a crimp sleeve 58. It should be noted that the crimp teeth 100 illustrated represent simply one example structure for providing a frictional fit with a crimp sleeve 58 and the Kevlar layer of a fiber optic cable and other types of friction-enhancing interlock structures may be provided at the crimp portion 60 of the rear insert 14 for terminating the cable to the rear insert 14.

The boot flange 66 defines flat portions 63 on radially opposite sides of the flange 66. As will be discussed in further detail below, the flats 63 on the boot flange 66 are used to align the rear insert 14 with respect to the front housing 12 such that the locking flanges 88 of the rear insert 14 align with the slots 50 formed on the sidewalls 18, 20 of the front housing 12.

It should be noted that although the flats 63 defined on the boot flanges 66 are not necessarily illustrated on all of the different versions of the rear inserts depicted herein used to form the fiber optic connector 10, if desired, the flats 63 can be incorporated on all of the versions to facilitate alignment.

Figure 34:
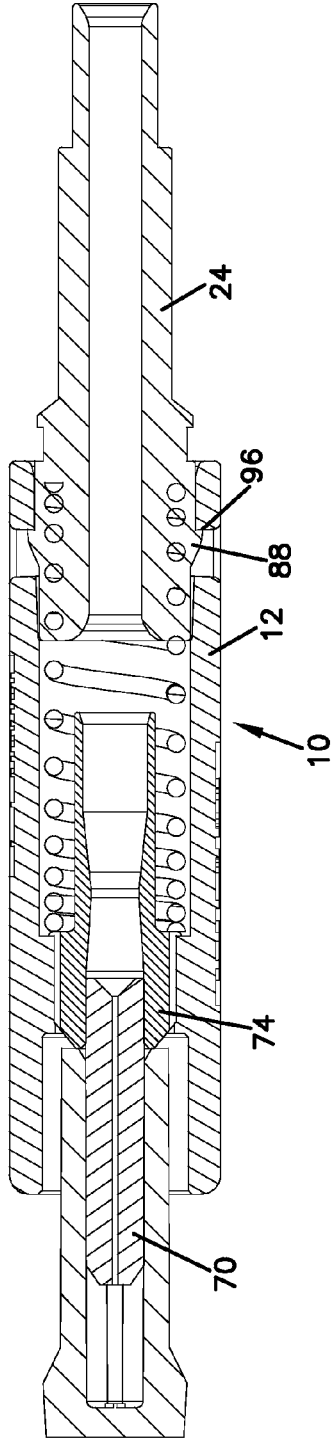
FIG. 34 illustrates a cross-section taken along line 34-34 of FIG. 33.
Figure 33:
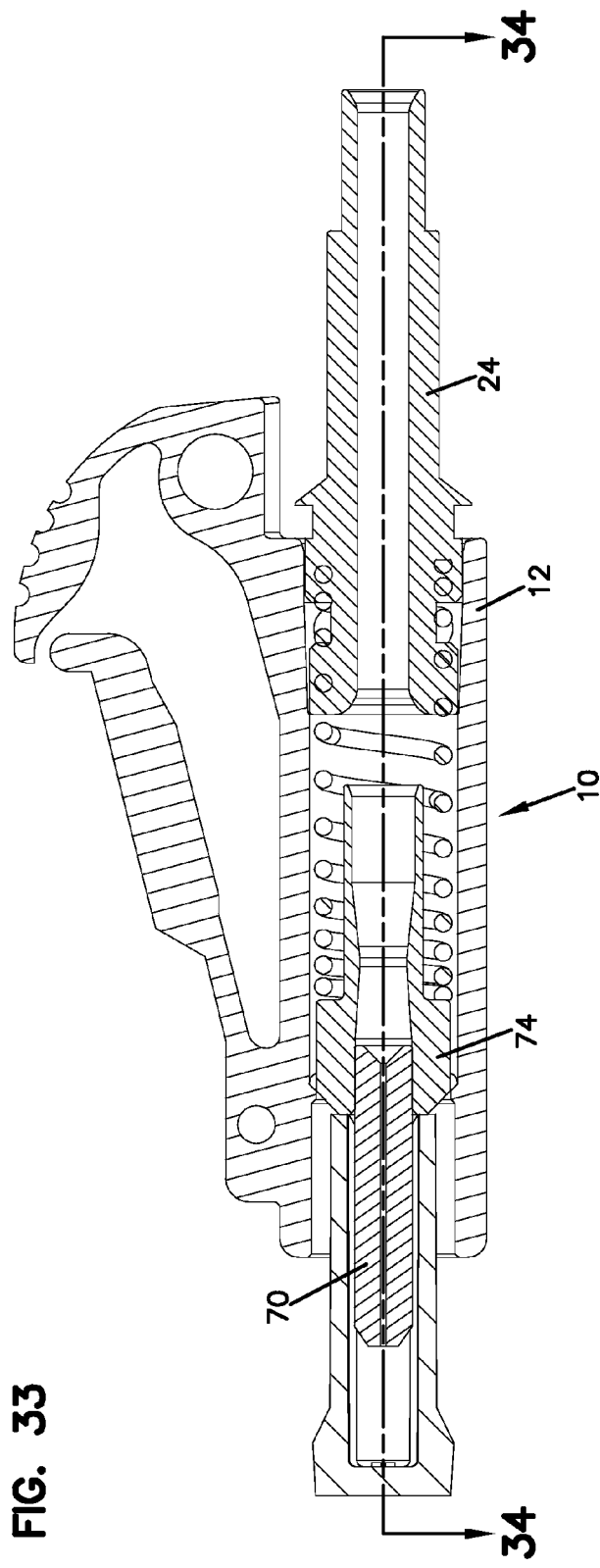
FIG. 33 illustrates a cross-sectional view of a fully assembled fiber optic connector according to FIG. 1, wherein the second embodiment of the rear insert of FIG. 27 is used to mate with the front housing to assemble the fiber optic connector.
Figure 66:
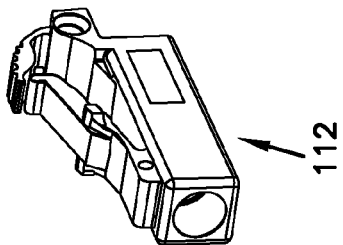
FIG. 66 illustrates a front perspective view of a front housing of the second embodiment of the fiber optic connector of FIG. 63.
Figure 74:
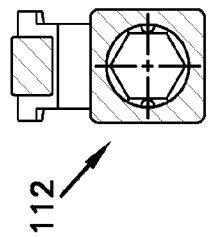
FIG. 74 is a cross-section taken along line 74-74 of FIG. 69.
Figure 69:
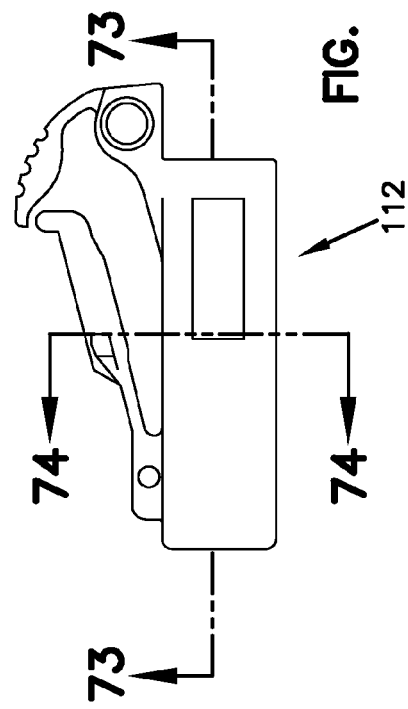
FIG. 69 is a side view of the front housing of FIG. 66.
Figure 73:
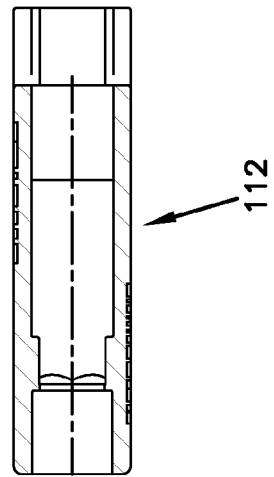
FIG. 73 is a cross-section taken along line 73-73 of FIG. 69.
Figure 71:
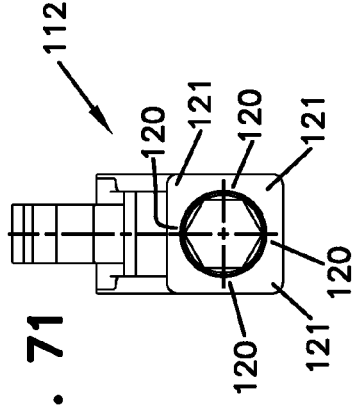
FIG. 71 is a front view of the front housing of FIG. 66.
Figure 70:
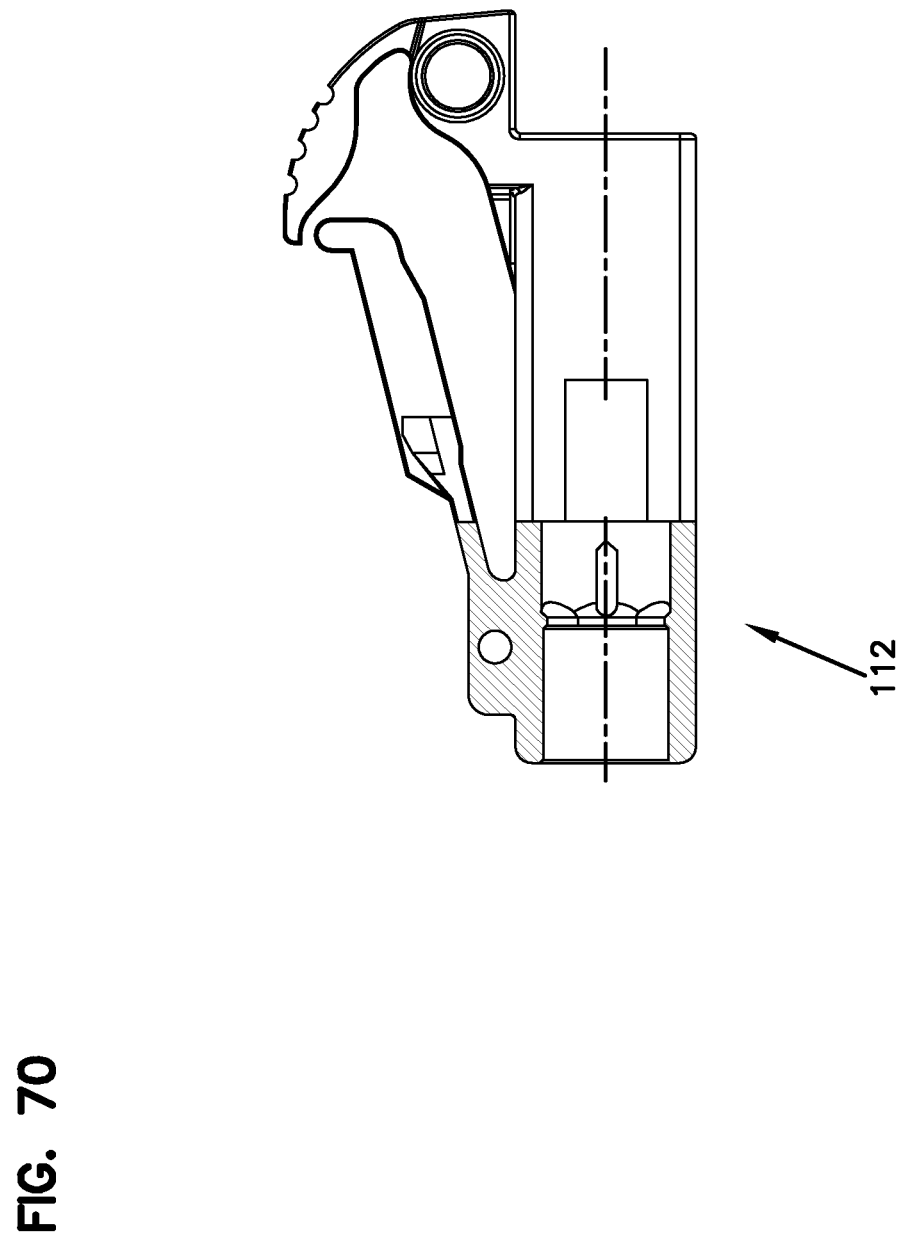
FIG. 70 illustrates a cross-sectional view of the front housing of FIG. 69 with the cross-section taken along line 70-70 of FIG. 68.
Figure 72:
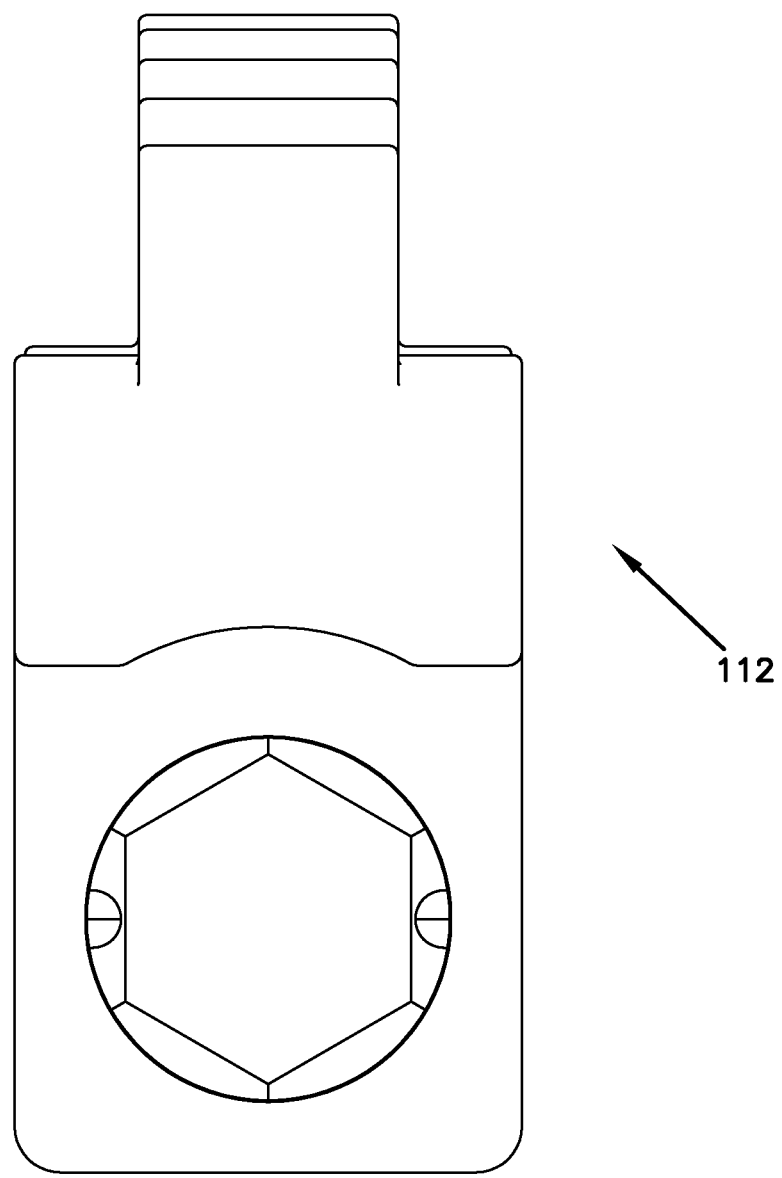
FIG. 72 is a rear view of the front housing of FIG. 66.

A second embodiment of a rear insert 24 of the various rear inserts that are capable of mating with the front housing 12 to form the fiber optic connector 10 is illustrated in FIGS. 27-32. The second embodiment of the rear insert 24 includes features similar to those of the first embodiment except that the second embodiment of the rear insert 24 defines a knurled (e.g., male diamond knurl) surface 101 instead of discrete crimp teeth 100 at the rear portion 60 of the insert 24. The knurled surface 101 defines a crimp zone for crimping the cable's reinforced Kevlar layer to the fiber optic connector 10. Please refer to FIGS. 33-34 for an illustration of the second embodiment of the rear insert 24 snapped within the front housing 12. The rear insert 24 also includes locking flanges 88, wherein the radially outermost portion 94 of the rear face 92 of the flanges 88 comes to a point or edge 96. The point or edge 96 is the rearmost extending part of the flanges 88. The point or edge 96 formed by the rear face 92, thus, defines a "fish hook" profile as in the previous embodiment of the rear insert, the fish hook profile configured to bite into the material of the front housing.

A third embodiment of a rear insert 34 of the various rear inserts that are capable of mating with the front housing 12 to form the fiber optic connector 10 is illustrated in FIGS. 35-40. The third embodiment of the rear insert 34 includes features similar to those of the second embodiment 24 except that the third embodiment of the rear insert 34 defines a stop tab/ring 102. The stop tab 102 is configured to abut against the rear endwall 30 of the front housing 12. The stop tab 102 provides reinforcement to the front housing 12 during side-loading. The stop tab 102 also provides a guiding function as it positions the locking flanges 88 at the proper depth within the internal cavity 48 of the front housing 12 for snapping into the slots 50. Please refer to FIGS. 41-42 for an illustration of the third embodiment of the rear insert 34 snapped within the front housing 12. The rear insert 34 also includes locking flanges 88, wherein the radially outermost portion 94 of the rear face 92 of the flanges 88 comes to a point or edge 96. The point or edge 96 is the rearmost extending part of the flanges 88. The point or edge 96 formed by the rear face 92, thus, defines a "fish hook" profile as in the previous embodiments of the rear insert, the fish hook profile configured to bite into the material of the front housing.

A fourth embodiment of a rear insert 44 of the various rear inserts that are capable of mating with the front housing 12 to form the fiber optic connector 10 is illustrated in FIGS. 43-48. The fourth embodiment of the rear insert 44 includes features similar to those of the third embodiment except that the fourth embodiment of the rear insert 44 defines discrete crimp teeth 100 instead of a knurled surface 101 at the rear portion 60 of the insert 44. The crimp teeth 100 define a crimp zone for crimping the cable's reinforced Kevlar layer to the fiber optic connector 10. The rear insert 44 also includes locking flanges 88, wherein the radially outermost portion 94 of the rear face 92 of the flanges 88 comes to a point or edge 96. The point or edge 96 is the rearmost extending part of the flanges 88. The point or edge 96 formed by the rear face 92, thus, defines a "fish hook" profile as in the previous embodiments of the rear insert, the fish hook profile configured to bite into the material of the front housing.

A fifth embodiment of a rear insert 54 of the various rear inserts that are capable of mating with the front housing 12 to form the fiber optic connector 10 is illustrated in FIGS. 49-54. The fifth embodiment of the rear insert 54 includes features similar to those of the third and fourth embodiments except that the fifth embodiment of the rear insert 54 defines a wider stop tab/ring 102. As discussed before, the stop tab 102 is configured to abut against the rear endwall 30 of the front housing 12 and provide reinforcement to the front housing 12 during side-loading. The stop tab 102 also positions the locking flanges 88 at the proper depth within the front housing 12 for snapping into the slots 50. Please refer to FIGS. 55-56 for an illustration of the fifth embodiment of the rear insert 54 snapped within the front housing 12. In the rear insert 54, the radially outermost portion 94 of the rear face 92 of the flanges 88 comes to a point or edge 96. The point or edge 96 is the rearmost extending part of the flanges 88. The point or edge 96 formed by the rear face 92, thus, defines a "fish hook" profile as in the previous embodiments of the rear insert, the fish hook profile configured to bite into the material of the front housing.

A sixth embodiment of a rear insert 64 of the various rear inserts that are capable of mating with the front housing 12 to form the fiber optic connector 10 is illustrated in FIGS. 57-62. The sixth embodiment of the rear insert 64 includes features similar to those of the first embodiment except that the sixth embodiment of the rear insert 64 defines a crimp portion 60 having a larger diameter than that of the first embodiment. The portion 60 of the rear insert 64 that defines the crimp zone is sized to crimp cable for 3.0 MM fiber, rather than 1.7 or 2.0 MM fiber as in the five previously illustrated examples. The rear insert 64 also includes locking flanges 88, wherein the radially outermost portion 94 of the rear face 92 of the flanges 88 comes to a point or edge 96. The point or edge 96 is the rearmost extending part of the flanges 88. The point or edge 96 formed by the rear face 92, thus, defines a "fish hook" profile as in the previous embodiments of the rear insert, the fish hook profile configured to bite into the material of the front housing.

The rear inserts described herein may be manufactured from various materials including a number of different metals.

As noted above, in a number of the illustrated rear inserts, the boot flanges 66 define flat portions 63 on radially opposite sides of the rear insert. The flats 63 on the boot flange 66 are used to align the locking flanges 88 of the rear insert with the slots 50 formed on the sidewalls 18, 20 of the front housing 12. Although the flats 63 defined on the boot flanges 66 are not necessarily illustrated on all of the different versions of the inserts used to form the fiber optic connector 10, if desired, the flats 63 can be incorporated on all of the versions to facilitate alignment. An example method of aligning a rear insert having the flats on the boot flanges with a front housing of the connector and assembling the two parts are illustrated in FIGS. 80-100 and will be described below in further detail. Although the example method is illustrated for a second embodiment of a fiber optic connector 110 that will be described in detail below, the same principles can be used in aligning and assembling the first embodiment of the fiber optic connector 10 that has been discussed above.

FIGS. 63-79 illustrate the second embodiment of a fiber optic connector 110 having features that are examples of inventive aspects in accordance with the disclosure. The second embodiment of the fiber optic connector 110 shares certain features with those of the first embodiment of the fiber optic connector 10 such as the ferrule hub 56, the compression spring 52, the crimp sleeve 58, and the strain relief boot 62. However, the second embodiment of the fiber optic connector 110 includes a different front housing 112 and a different rear insert 114.

The front housing 112 of the fiber optic connector 110 is similar to that of the first embodiment except that the front housing 112 lacks the slots 50 formed on the sidewalls 18, 20 adjacent the rear end 30 of the front housing 12 of the first embodiment of the fiber optic connector 10. As in the front housing 12, the front housing 112 of the second embodiment of the fiber optic connector 110 defines a circular rear opening 146 through which it receives the internal components of the connector 110 and the rear insert 114.

Unlike the rear insert 14, 24, 34, 44, 54, 64 of the first embodiment of the fiber optic connector 10, the rear insert 114 of the fiber optic connector 110 is not configured to be snap-fit to the front housing 112. The rear insert 114 is configured to be press-fit into the front housing 112. The rear insert 114 lacks the locking flanges 88 formed on the rear insert 14 of the first embodiment of the fiber optic connector 10.

As shown in FIGS. 63-65 and 93-98, the front portion 116 of the rear insert 114 that is configured to be press-fit into the front housing 112 defines retention teeth 117. The retention teeth 117 are configured to bite into the material of the front housing 112 and increase the retention between the front housing 112 and the rear insert 114.

As shown in FIGS. 75-79, the rear insert 114 of the second embodiment of the fiber optic connector 110 also includes longitudinal flats 118 formed around the front portion 116 of the rear insert 114 that is inserted into the front housing 112. Since the rear insert 114 is press-fit into the front housing 112, damage to the connector 110 such as cracking caused by stresses put on the connector 110 from side-loading is a real concern. The flats 118 are designed to reduce radial stresses that may occur in the front housing 112 caused by side-loading of the connector 110. The cracking generally tends to occur where the wall thickness of the front housing 112 is the thinnest. According to the depicted embodiment, the rear insert 114 includes four of the longitudinal flats 118. The flats 118 reduce the effective outer diameter of the press-fit portion 116 of the rear insert 114.

According to one example method of assembly, the flats 118 may generally be oriented so that they align with the thinnest parts 120 of the wall 122 defining the circular rear opening 146 of the front housing 112. By orienting the rear insert 114 in this manner with respect to the front housing 112, radial stresses may be significantly reduced on the thinnest walled areas 120 of the front housing 112. The radial stresses may then be concentrated to the thicker wall 121 sections of the front housing 112.

FIGS. 80-100 illustrate the method of assembly for assembling the fiber optic connector 10, 110. As noted above, even though the assembly method and the tools/fixtures used are described with respect to the second embodiment of the fiber optic connector 110, the assembly method and the tools/fixtures can be used for assembling the first embodiment of the fiber optic connector 10.

Figure 80:
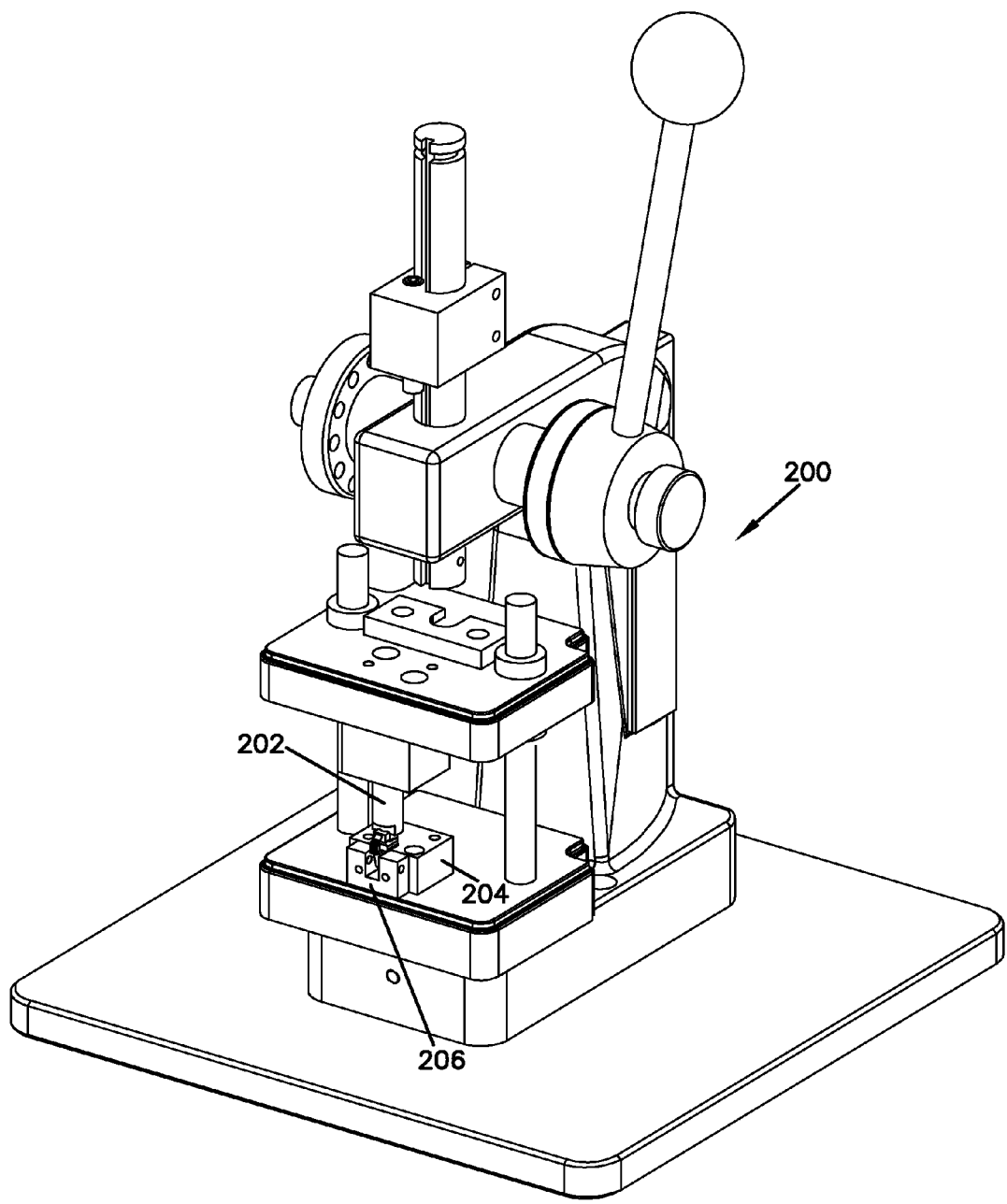
FIG. 80 illustrates an assembly press configured to align and mate the front housings and the rear inserts of the first and second embodiments of the fiber optic connectors to form the first and second embodiments of the fiber optic connectors.
Figure 88:
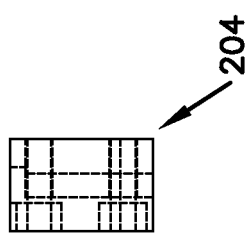
FIG. 88 is a side view of the base press of FIG. 85.
Figure 85:
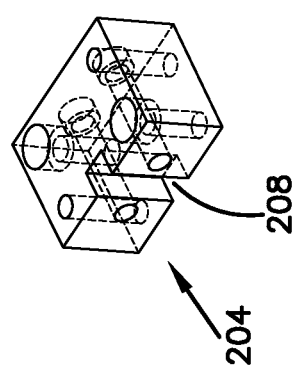
FIG. 85 is a perspective view of a base press of the assembly press of FIG. 80.
Figure 86:
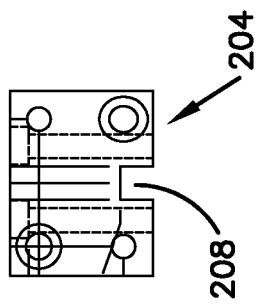
FIG. 86 is a top view of the base press of FIG. 85.
Figure 87:
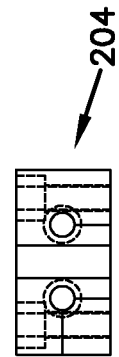
FIG. 87 is a front view of the base press of FIG. 85.
Figure 89:
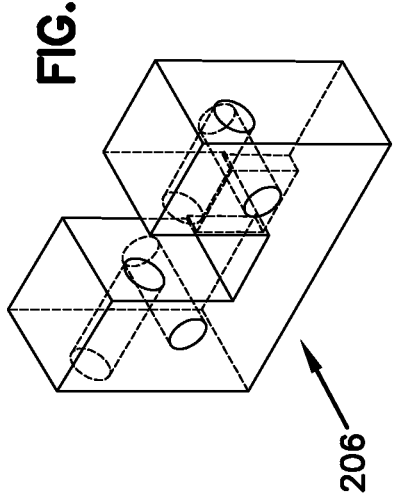
FIG. 89 is a perspective view of a nest cover of the assembly press of FIG. 80.
Figure 92:
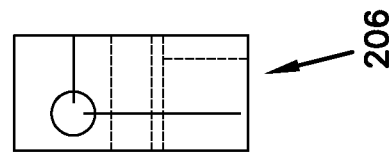
FIG. 92 is a side view of the nest cover of FIG. 89.
Figure 90:
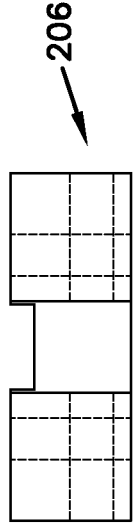
FIG. 90 is a top view of the nest cover of FIG. 89.
Figure 91:
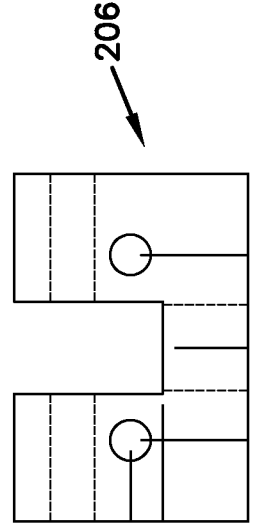
FIG. 91 is a front view of the nest cover of FIG. 89.

The assembly press 200 shown in FIG. 80 generally includes a collet 202 configured to receive the rear insert 114 and a base press 204 configured to receive the front housing 112 of the fiber optic connector 110. A nest cover 206 keeps the front housing 112 mounted within the base press 204.

As shown in FIGS. 85-88 and 93-98, the base press 204 defines a generally rectangular cutout 208 for nesting the front housing 112. The cutout 208 is sized to fit the outer dimensions of the front housing body and prevent it from rotation therewithin. Once the front housing 112 is placed within the rectangular cutout 208, the nest cover 206 keeps the front housing 112 clamped therein.

The collet 202, shown in FIGS. 81-84 and 93-100, includes a generally cylindrical body 210 defining a bottom end 212 and a top end 214. The bottom end 212 that faces the base press 204 defines a cavity 216 for receiving the rear insert 114. The cavity 216 defines a smaller diameter portion 218 that receives the crimp portion 160 of the rear insert 114. The cavity 216 defines a larger portion 220 having flats 222 on opposing sides thereof. The flats 222 are configured to mate with the flats 63 defined on the boot flanges 66 of the rear inserts 114 in orienting the rear inserts 114 with respect to the front housings 112 held by the base press 204. FIGS. 93-95 illustrate a rear insert 114 partially inserted into the cavity 216 of the collet 202 wherein the crimp portion 160 of the rear insert 114 has been inserted into the smaller diameter portion 218. FIGS. 96-100 illustrate the rear insert 114 fully inserted into the cavity 216 of the collet 202 wherein the flats 63 on the boot flange 66 have been aligned with the flats 222 of the cavity 220 in orienting the rear insert 114.

Once the rear insert 114 is placed within the collet 202 and the front housing 112 is placed within the base press 204 and held therein with the nest cover 206, the collet 202 and the base press 204 are clamped together using the assembly press 200, coupling the rear insert 114 to the front housing 112. In the case of the first embodiment of the fiber optic connector 10, the rear insert 14 and the front housing 12 are brought together until the rear insert 14 snap-fits into the slots 50 of the front housing 12. In the case of the second embodiment of the fiber optic connector 110, the rear insert 114 is coupled to the front housing 112 with a friction fit, with the retention teeth 117 of the rear insert 114 biting into the material of the front housing 112.

Regarding the second embodiment of the fiber optic connector 110, according to another method of assembly, after the rear insert 114 has been fully pressfit into the front housing 112, the rear insert 114 could be rotated therewithin resulting in the retention teeth 117 operating like tap-cutting teeth within the front housing 112. After the rear insert 114 is rotated a full revolution, there will be internal grooves formed 360° around the inner cavity of the front housing 112. By having these grooves in the front housing 112, the press-fit retention between the rear insert 114 and the front housing 112 may be increased. Radial stresses may also be reduced by rotating the rear insert 114 within the front housing 112 since internal grooves are created, reducing the overall radial forces between the front housing 112 and the rear insert 114. If the rear insert 114 is rotated as such, the need to re-align the longitudinal flats 118 with the thin-walled portions 120 of the front housing 112 may be eliminated. However, if desired, the longitudinal flats 118 may be re-aligned with the thin-walled portions 120 of the front housing 112 even after creating the internal grooves.

As noted earlier, the flats 63 formed on the boot flange 66 of the rear insert 114 of the second embodiment of the fiber optic connector 110 are also provided on the boot flange 66 of the rear insert 14 of the first embodiment of the fiber optic connector 10. Thus, the rear insert 14 and the front housing 12 of the first embodiment of the fiber optic connector 10 are aligned and assembled together in a similar manner to that of the second embodiment. Instead of the longitudinal flats 118 being aligned with the thin wall portions 120 as in the second embodiment, the locking flanges 88 of the rear insert 14 are aligned with the slots 50 defined on the front housing 12 in assembling the first embodiment of the fiber optic connector 10.

Although in the foregoing description, terms such as "top", "bottom", "front", "back", "right", and "left" were used for ease of description and illustration, no restriction is intended by such use of the terms. The connectors 10, 110 described herein can be used in any orientation, depending upon the desired application.

The above specification provides examples of how certain inventive aspects may be put into practice. It will be appreciated that the inventive aspects can be practiced in other ways than those specifically shown and described herein without departing from the spirit and scope of the inventive aspects.

The invention claimed is:

1. A fiber optic connector comprising:
    a front housing defining a top wall, a bottom wall, a first sidewall, a second sidewall, a front opening at a front end, a circular rear opening at a rear end, and an internal cavity extending therebetween, each of the first and second sidewalls defining a slot extending from the internal cavity to an exterior of the front housing;
    a fiber optic ferrule carrying a terminal end of an optical fiber, at least a portion of the fiber optic ferrule extending through the front opening;
    a rear insert, the rear insert including a generally cylindrical front portion configured to be inserted into the front housing through the rear opening, the rear insert including a crimp portion for crimping a fiber optic cable carrying the optical fiber, the rear insert including a pair of locking flanges positioned on opposite sides of the rear insert extending radially away from the generally cylindrical front portion, the locking flanges configured to snap-fit into the slots defined on the first and second sidewalls of the front housing for coupling the rear insert to the front housing with a snap-fit interlock, each of the locking flanges defining a front face and a rear face, the radially outermost portion of the rear face defining an edge, the edge being the rearmost extending portion of the locking flange, wherein the rear face extends generally at an acute angle with respect to a longitudinal axis defined by the generally cylindrical portion of the rear insert, wherein the edge is configured to dig into the material forming the front housing when a side load is applied to the rear insert that deflects the rear insert with respect to the front housing, the side load being in a direction extending generally from the first sidewall to the second sidewall; and a spring positioned between the fiber optic ferrule and the rear insert and biasing the ferrule in a forward direction with respect to the rear insert.

2. A fiber optic connector according to claim 1, further including a ferrule hub for carrying the fiber optic ferrule, the ferrule hub and the internal cavity defining intermating shapes for allowing the ferrule hub to be interlocked within the cavity at a plurality of discrete rotational interlocking positions.

3. A fiber optic connector according to claim 1, wherein the rear insert defines a boot flange for receiving a strain relief boot of the fiber optic cable, the boot flange defining flats on opposing sides of the flange.

4. A fiber optic connector according to claim 1, wherein the crimp portion of the rear insert includes a plurality of annular crimp teeth.

5. A fiber optic connector according to claim 1, wherein the crimp portion of the rear insert includes a knurled surface.

6. A fiber optic connector according to claim 1, wherein the fiber optic connector defines an LC footprint, the fiber optic connector including a latch extending at a generally acute angle from the top wall in a direction from the front end toward the rear end and a latch trigger extending at a generally acute angle from the top wall in a direction from the rear end toward the front end, the latch trigger configured to contact the latch when pressed downwardly.

7. A fiber optic connector according to claim 1, further comprising a pin hole for receiving a pin for connecting two of the fiber optic connectors in a side-by-side orientation to form a duplex fiber optic connector.

8. A fiber optic connector according to claim 1, wherein the rear insert defines a stop tab configured to abut the rear end of the front housing to limit the insertion of the rear insert into the front housing and to position the locking flanges at the correct depth within the internal cavity with respect to the slots for the snap-fit interlock.

9. A rear insert configured to be inserted into a front housing of a fiber optic connector, wherein the front housing defines a top wall, a bottom wall, a first sidewall, a second sidewall, a front opening at a front end, a circular rear opening at a rear end, and an internal cavity extending therebetween, each of the first and second sidewalls defining a slot extending from the internal cavity to an exterior of the front housing, the rear insert comprising:

a generally cylindrical front portion configured to be inserted into the front housing through the rear opening, the rear insert including a crimp portion for crimping a fiber optic cable carrying the optical fiber, the rear insert including a pair of locking flanges positioned on opposite sides of the rear insert extending radially away from the generally cylindrical front portion, the locking flanges configured to snap-fit into the slots defined on the first and second sidewalls of the front housing for coupling the rear insert to the front housing with a snap-fit interlock, each of the locking flanges defining a front face and a rear face, the radially outermost portion of the rear face defining an edge, the edge being the rearmost extending portion of the locking flange, wherein the rear face extends generally at an acute angle with respect to a longitudinal axis defined by the generally cylindrical portion of the rear insert, wherein the edge is configured to dig into the material forming the front housing when a side load is applied to the rear insert that deflects the rear insert with respect to the front housing, the side load being in a direction extending generally from the first sidewall to the second sidewall.

\* \* \* \* \*